(12) United States Patent
Yang et al.

(10) Patent No.: US 12,617,254 B2
(45) Date of Patent: May 5, 2026

(54) HEAT MANAGEMENT SYSTEM FOR VEHICLE AND VEHICLE

(71) Applicant: BYD COMPANY LIMITED, Guangdong (CN)

(72) Inventors: Dongsheng Yang, Shenzhen (CN); Yunhui Bai, Shenzhen (CN); Junyan Zhang, Shenzhen (CN); Shangzhong Zhao, Shenzhen (CN); Tao Liang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 344 days.

(21) Appl. No.: 18/523,888

(22) Filed: Nov. 30, 2023

(65) Prior Publication Data

US 2024/0092145 A1     Mar. 21, 2024

Related U.S. Application Data

(63) Continuation of application No. PCT/CN2022/116348, filed on Aug. 31, 2022.

(30) Foreign Application Priority Data

Sep. 30, 2021     (CN) .......................... 202111164613.5

(51) Int. Cl.
*H01M 10/615*          (2014.01)
*B60H 1/00*            (2006.01)
(Continued)

(52) U.S. Cl.
CPC ..... *B60H 1/00921* (2013.01); *B60H 1/00207* (2013.01); *B60H 1/00278* (2013.01);
(Continued)

(58) Field of Classification Search
CPC ...... B60H 1/10; B60H 1/143; B60H 1/00207; B60H 1/00278; B60H 1/00921;
(Continued)

(56) References Cited

U.S. PATENT DOCUMENTS 3,209,551 A     10/1965   Louis
9,731,578 B2     8/2017   Johnston
(Continued)

FOREIGN PATENT DOCUMENTS

CL          2023003829 A1      5/2024
CN          102275521 A       12/2011
(Continued)

OTHER PUBLICATIONS

International Search Report and Written Opinion for Application No. PCT/CN2022/116348, mailed on Dec. 5, 2022, 10 pages.
(Continued)

*Primary Examiner* — Jeffrey J Restifo
(74) *Attorney, Agent, or Firm* — Sheppard Mullin Richter & Hampton LLP

(57)     ABSTRACT

A heat management system includes a first heat exchanger, a second heat exchanger, a heat pump, an electric assembly waterway, a radiator waterway, a battery waterway, and a heat exchange waterway. The heat pump module includes a first heat exchange pipeline and a second heat exchange pipeline. A first heat exchange passage and a second heat exchange passage of the first heat exchanger are respectively disposed on the second heat exchange pipeline and the heat exchange waterway. A third heat exchange passage of the second heat exchanger is disposed on the first heat exchange pipeline, and a fourth heat exchange passage of the second heat exchanger is in communication with the radiator waterway. The radiator waterway and the electric assembly waterway may be in communication in series.

20 Claims, 3 Drawing Sheets

(51) Int. Cl.

| | |
|---|---|
| *B60H 1/10* | (2006.01) |
| *B60H 1/14* | (2006.01) |
| *B60K 11/04* | (2006.01) |
| *H01M 10/625* | (2014.01) |
| *H01M 10/6569* | (2014.01) |
| *H01M 10/663* | (2014.01) |

(52) U.S. Cl.
CPC .............. *B60H 1/10* (2013.01); *B60H 1/143* (2013.01); *B60K 11/04* (2013.01); *H01M 10/615* (2015.04); *H01M 10/625* (2015.04); *H01M 10/6569* (2015.04); *H01M 10/663* (2015.04); *B60H 2001/00307* (2013.01); *B60H 2001/00928* (2013.01); *B60H 2001/00935* (2013.01); *H01M 2220/20* (2013.01)

(58) Field of Classification Search
CPC ............. H01M 10/615; H01M 10/625; H01M 10/663; H01M 10/6569
See application file for complete search history.

(56) References Cited

U.S. PATENT DOCUMENTS

| | | | |
|---|---|---|---|
| 10,987,998 B2* | 4/2021 | Kim | B60H 1/00278 |
| 11,007,850 B2* | 5/2021 | Kim | B60H 1/00921 |
| 11,065,934 B2* | 7/2021 | Lee | B60H 1/00328 |
| 11,207,941 B2* | 12/2021 | Lee | B60H 1/00385 |
| 11,214,116 B2* | 1/2022 | Kim | B60H 1/143 |
| 11,305,607 B2* | 4/2022 | Kim | B60L 58/26 |
| 11,318,813 B2* | 5/2022 | Allgaeuer | B60H 1/32284 |
| 11,325,444 B2* | 5/2022 | Kim | B60H 1/00428 |
| 11,351,838 B2* | 6/2022 | Kim | H01M 10/625 |
| 11,370,325 B2* | 6/2022 | Durrani | B60L 58/26 |
| 11,383,582 B2* | 7/2022 | Lee | B60H 1/00921 |
| 11,390,137 B2* | 7/2022 | Mackenzie | H01M 10/613 |
| 11,390,141 B2* | 7/2022 | Kim | B60H 1/143 |
| 11,458,811 B2* | 10/2022 | Kim | B60H 1/32284 |
| 11,858,309 B2* | 1/2024 | Song | B60H 1/00278 |
| 11,870,045 B2* | 1/2024 | Kim | H01M 10/6569 |
| 11,884,127 B2* | 1/2024 | Jeong | B60L 58/26 |
| 11,949,078 B2* | 4/2024 | Lee | H01M 10/6568 |
| 12,220,966 B2* | 2/2025 | Kim | B60H 1/143 |
| 12,275,291 B2* | 4/2025 | Durrani | B60H 1/32281 |
| 12,275,292 B2* | 4/2025 | Song | B60H 1/00899 |
| 12,280,634 B2* | 4/2025 | Dong | B60H 1/00278 |
| 12,326,292 B2* | 6/2025 | Akiki | F25B 25/005 |
| 12,397,610 B2* | 8/2025 | Kim | B60H 1/00921 |
| 12,427,838 B2* | 9/2025 | Yahia | H01M 10/625 |
| 2019/0070924 A1 | 3/2019 | Mancini et al. | |
| 2019/0351740 A1 | 11/2019 | Filipkowski et al. | |
| 2020/0122545 A1 | 4/2020 | Lee et al. | |
| 2022/0332163 A1* | 10/2022 | Cagliero | B60H 1/00278 |
| 2022/0332164 A1* | 10/2022 | Cagliero | H01M 10/615 |
| 2023/0382181 A1* | 11/2023 | Dong | B60H 1/00278 |
| 2023/0415593 A1* | 12/2023 | Lee | H01M 10/615 |
| 2024/0017585 A1* | 1/2024 | Liu | H01M 10/635 |
| 2024/0092138 A1* | 3/2024 | Yang | H01M 10/615 |
| 2024/0092145 A1* | 3/2024 | Yang | B60H 1/10 |
| 2024/0162530 A1* | 5/2024 | Lee | B60H 1/143 |
| 2025/0065689 A1* | 2/2025 | Zhang | B60L 58/26 |
| 2025/0187391 A1* | 6/2025 | Takeuchi | B60H 1/00392 |
| 2025/0201965 A1* | 6/2025 | Wu | H01M 10/6554 |

FOREIGN PATENT DOCUMENTS

| | | |
|---|---|---|
| CN | 107351631 A | 11/2017 |
| CN | 108482067 A | 9/2018 |
| CN | 109895591 A | 6/2019 |
| CN | 111251802 A | 6/2020 |
| CN | 111251803 A | 6/2020 |
| CN | 112339527 A | 2/2021 |
| EP | 1291206 A1 | 3/2003 |
| FR | 3078390 A1 | 8/2019 |
| JP | 2005200011 A | 7/2005 |
| JP | 2007510586 A | 4/2007 |
| JP | 2020179839 A | 11/2020 |
| KR | 1020200123952 A | 11/2020 |
| WO | 2016069791 A1 | 5/2016 |
| WO | 2020071803 A1 | 4/2020 |

OTHER PUBLICATIONS

Extended European Search Report for European Application No. 22874537.8 mailed on Sep. 16, 2024.
First Office Action for Chinese Application No. 202111164613.5 mailed on Jul. 10, 2024.
Notification of grant of patent right for invention for Chinese Application No. 202111164613.5 mailed on Aug. 15, 2024.
International Preliminary Report on Patentability Chapter I for International Application No. PCT/CN2022/116348 mailed on Apr. 11, 2024.
Examination Report No. 1 for Australian Application No. 2022355229 mailed on Dec. 6, 2024.
Examination Report No. 2 for Australian Application No. 2022355229 mailed on Jun. 25, 2025.
Office Action for Korean Application No. 10-2023-7041419 mailed on Jun. 25, 2025.
Notice of Reasons for Refusal for Japanese Application No. 2023-580613 mailed on Jul. 29, 2025.
Notice of Reasons for Refusal for Japanese Application No. 2023-580613 mailed on Jan. 21, 2025.
Office Action for Brazilian Application No. 112023026302 mailed on Jul. 9, 2025.
Office Action and Search Report for Chilean Application No. 2023003827 mailed on Oct. 14, 2024.
Office Action and Search Report for Chilean Application No. 2023003827 mailed on Jan. 15, 2025.

* cited by examiner

HEAT MANAGEMENT SYSTEM FOR VEHICLE AND VEHICLE

CROSS-REFERENCE TO RELATED APPLICATIONS

This application is a Continuation Application of International Patent Application No. PCT/CN2022/116348, filed on Aug. 31, 2022, which is based on and claims priority to and benefits of Chinese Patent Application No. 202111164613.5 filed on Sep. 30, 2021. The entire content of all of the above-referenced applications is incorporated herein by reference.

FIELD

The present disclosure relates to the field of vehicle technologies, and more particularly, to a heat management system for a vehicle and a vehicle.

BACKGROUND

In the related art, an electric assembly module, a battery module, a heat pump module, and an engine module are integrated and controlled, so that they coordinate with each other, to reduce energy consumption of an entire vehicle, or to implement heat management and proper distribution and utilization of the entire vehicle in a hybrid mode.

However, in the foregoing, complex heat management requirements in different driving modes cannot be met. Excess heat interacts with other circuits in an extraction process, making it impossible to maximize an energy efficiency of the heat pump module in a heating process. Moreover, when the temperature is lower than ~5° C., a heating effect of each module is poor and the system cannot provide a sufficient heat source. Conventional techniques do not consider that both rapid warm-up of an engine and heating a passenger compartment in winter are to be conducted in parallel. Also, when the temperature is low, a battery pack needs to be heated rapidly. In addition, a plurality of radiators need to be arranged in a front cabin of the vehicle, which is not suitable to optimizing the arrangement and reducing the weight of the front cabin of the vehicle.

SUMMARY

The present disclosure resolves at least one of the technical problems in the related art. The present disclosure provides a heat management system for a vehicle. The heat management system is highly integrated, easy to arrange, and may fully utilize the energy, thereby reducing energy loss. In addition, an air refrigerating heat exchanger does not need to be arranged in a front cabin of a vehicle, which optimizes the arrangement and reduces the weight of the front cabin of the vehicle.

The present disclosure further provides a vehicle.

The heat management system for a vehicle according to the present disclosure includes: a first heat exchanger having a first heat exchange passage and a second heat exchange passage; a second heat exchanger having a third heat exchange passage and a fourth heat exchange passage; a heat pump including a compressor, a heating pipeline, a first heat exchange pipeline, a refrigerating pipeline, a gas-liquid separator, a first switching pipeline, and a second heat exchange pipeline, a condenser disposed on the heating pipeline, an evaporator disposed on the refrigerating pipeline, the third heat exchange passage disposed on the first heat exchange pipeline, and the first heat exchange passage disposed on the second heat exchange pipeline; the compressor, the heating pipeline, the first heat exchange pipeline, the refrigerating pipeline, and the gas-liquid separator being connected sequentially, the refrigerating pipeline, the first switching pipeline, and the second heat exchange pipeline being connected in parallel, and the refrigerating pipeline, the first switching pipeline, and the second heat exchange pipeline being in communication between the first heat exchange pipeline and the gas-liquid separator; an electric assembly waterway; a radiator waterway, an electric assembly disposed on the electric assembly waterway, a radiator disposed on the radiator waterway, the radiator waterway being in communication with the electric assembly waterway, and the radiator waterway being in communication with the fourth heat exchange passage; and a heat exchange waterway, the second heat exchange passage disposed on the heat exchange waterway.

According to the heat management system of the present disclosure, the first heat exchanger is connected to the battery module, so that heat generated by the battery may be released through the first heat exchanger, to prevent the battery from being damaged due to excessive heating. The heat pump module and the electric assembly module are simultaneously connected to the second heat exchanger, so that the heat pump module may release the heat through the electric assembly, and may also absorb heat through the electric assembly. In this way, integration is high and arrangement is easy. By adjusting a communication manner between the passages, the heat emitted by the engine module may heat the battery module. In this way, the battery module may have a better working environment, so that the battery module may work better, may make full use of energy, and reduce energy loss. In addition, the second heat exchanger is arranged. In this way, an air refrigerating heat exchanger does not need to be arranged/disposed in a front cabin of a vehicle, to optimize the arrangement and reduce the weight of the front cabin of the vehicle.

In some examples of the present disclosure, the heat management system for a vehicle further includes: a battery waterway, a battery disposed on the battery waterway; and a control valve group connected to the battery waterway, the electric assembly waterway, the radiator waterway, and the heat exchange waterway and configured to switch between a first state and a second state; when the control valve group is in the first state, the radiator waterway being in communication with the electric assembly waterway or the fourth heat exchange passage, or the battery waterway being in communication with the heat exchange waterway, or the radiator waterway being in communication with the electric assembly waterway or the fourth heat exchange passage, and the battery waterway being in communication with the heat exchange waterway; and when the control valve group is in the second state, the battery waterway being in communication with the electric assembly waterway or the fourth heat exchange passage.

In some examples of the present disclosure, the heat management system for a vehicle further includes: an engine waterway, an engine disposed on the engine waterway, the first state of the control valve group including a first sub-state and a second sub-state, and the second state of the control valve group including a third sub-state and a fourth sub-state; when the control valve group is in the first sub-state, the electric assembly waterway or the fourth heat exchange passage being in communication with the radiator waterway; when the control valve group is in the second sub-state, (1) the electric assembly waterway or the fourth heat exchange passage, (2) the radiator waterway, and (3) the engine waterway being in communication in series sequentially; when the control valve group is in the third sub-state, the electric assembly waterway or the fourth heat exchange passage being in communication with the battery waterway; and when the control valve group is in the fourth sub-state, (1) the electric assembly waterway or the fourth heat exchange passage, (2) the battery waterway, and (3) the engine waterway being in communication sequentially.

In some examples of the present disclosure, the control valve group includes: a first four-way valve, where the first four-way valve has a first valve port, a second valve port, a third valve port, and a fourth valve port, the first valve port and the second valve port are respectively disposed at a first end of the electric assembly waterway and a first end of the radiator waterway, and the third valve port and the fourth valve port are disposed on the engine waterway; a second four-way valve, where the second four-way valve has a fifth valve port, a sixth valve port, a seventh valve port, and an eighth valve port, the fifth valve port and the sixth valve port are disposed on the radiator waterway, and the seventh valve port and the eighth valve port are disposed on the battery waterway; and a third four-way valve, where the third four-way valve has a ninth valve port, a tenth valve port, an eleventh valve port, and a twelfth valve port, the ninth valve port and the tenth valve port are disposed at a second end of the electric assembly waterway and a second end of the radiator waterway, and the eleventh valve port and the twelfth valve port are disposed on the battery waterway; when the control valve group is in the first sub-state, the first valve port is in communication with the second valve port, the third valve port is in communication with the fourth valve port, the fifth valve port is in communication with the sixth valve port, the seventh valve port is in communication with the eighth valve port, the ninth valve port is in communication with the tenth valve port, and the eleventh valve port is in communication with the twelfth valve port; when the control valve group is in the second sub-state, the first valve port is in communication with the fourth valve port, the second valve port is in communication with the third valve port, the fifth valve port is in communication with the sixth valve port, the seventh valve port is in communication with the eighth valve port, the ninth valve port is in communication with the tenth valve port, and the eleventh valve port is in communication with the twelfth valve port; when the control valve group is in the third sub-state, the first valve port is in communication with the second valve port, the third valve port is in communication with the fourth valve port, the fifth valve port is in communication with the eighth valve port, the sixth valve port is in communication with the seventh valve port, the ninth valve port is in communication with the twelfth valve port, and the tenth valve port is in communication with the eleventh valve port; and when the control valve group is in the fourth sub-state, the first valve port is in communication with the fourth valve port, the second valve port is in communication with the third valve port, the fifth valve port is in communication with the eighth valve port, the sixth valve port is in communication with the seventh valve port, the ninth valve port is in communication with the twelfth valve port, and the tenth valve port is in communication with the eleventh valve port.

In some examples of the present disclosure, a first two-way valve is disposed on the electric assembly waterway, and the first two-way valve controls the electric assembly waterway to be in communication or not in communication between the sixth valve port of the second four-way valve and the ninth valve port of the third four-way valve.

In some examples of the present disclosure, the radiator waterway includes a radiator branch and a connected branch, the radiator is disposed on the radiator branch, the radiator branch and the connected branch are connected in parallel, and the radiator branch and the connected branch are configured to switch between a communication state and an non-communication state.

In some examples of the present disclosure, the condenser includes: a first condenser and a second condenser, and the second condenser and the first condenser are connected in parallel.

In some examples of the present disclosure, the evaporator includes: a first evaporator and a second evaporator, and the first evaporator and the second evaporator are connected in parallel between two connection ends.

In some examples of the present disclosure, a second two-way valve is disposed on the refrigerating pipeline, and a first end of the second two-way valve is connected to the first heat exchange pipeline and a second end of the second two-way valve is connected to one of the two connection ends.

In some examples of the present disclosure, the heat management system for a vehicle further includes: an engine waterway, the engine waterway including: the engine and a warm air core, and the engine and the warm air core being connected in series.

The vehicle according to the present disclosure includes the heat management system for a vehicle.

Additional aspects and advantages of the present disclosure will be given in the following description, some of which will become apparent from the following description or may be learned from practices of the present disclosure.

BRIEF DESCRIPTION OF THE DRAWINGS

The foregoing and/or additional aspects and advantages of the present disclosure will become apparent and comprehensible in the embodiment description made with reference to the following accompanying drawings, where.

REFERENCE NUMERALS

Figures 1, 2:
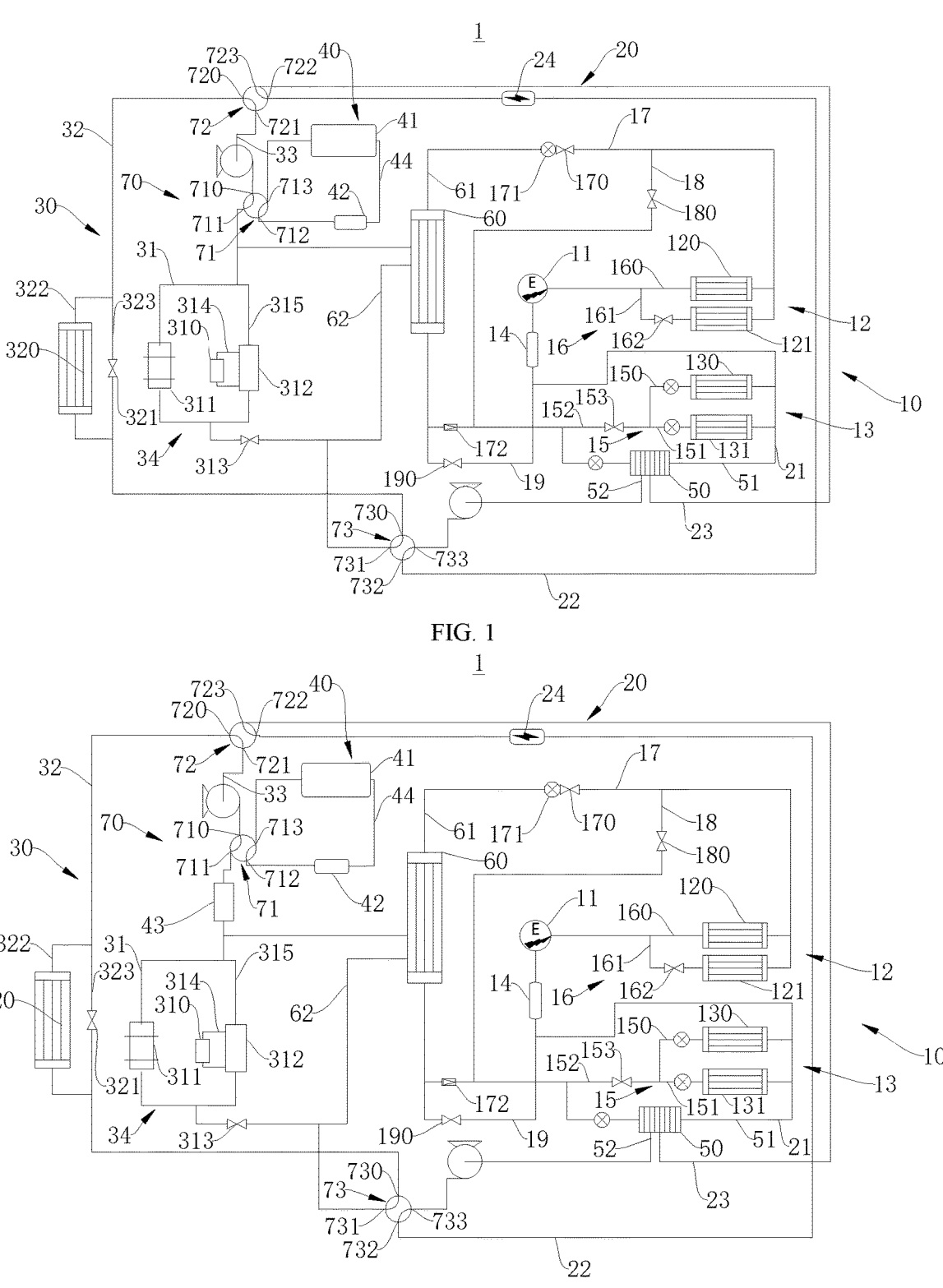
FIG. 1 is a schematic diagram of a first connection of a structure of a heat management system according to an embodiment of the present disclosure.
FIG. 2 is a schematic diagram of a first connection of another structure of a heat management system according to an embodiment of the present disclosure.

1. Heat management system; vehicle 2;
10: heat pump module; 11: compressor; 12: condenser module; 120: first condenser; 121: second condenser; 13: evaporator module; 130: first evaporator; 131: second evaporator; 14: gas-liquid separator; 15: refrigerating pipeline; 150: front refrigerating branch; 151: rear refrigerating branch; 152: main refrigerating flow path; 153: second two-way valve; 16: heating pipeline; 160: front heating branch; 161: rear heating branch; 162: fifth two-way valve; 17: first heat exchange pipeline; 170: seventh two-way valve; 171: expansion valve; 172: one-way valve; 18: second switching pipeline; 180: third two-way valve; 19: first switching pipeline; 190: fourth two-way valve;

20: battery module; 21: second heat exchange pipeline; 22: battery waterway; 23: heat exchange waterway; 24: battery; 30: electric assembly module; 31: electric assembly waterway; 310: motor; 311: motor controller; 312: third heat exchanger; 313: first two-way valve; 314: fifth heat exchange passage; 315: sixth heat exchange passage; 32: radiator waterway; 320: radiator; 321: sixth two-way valve; 322: radiator branch; 323: connected branch; 33: pump waterway; 34: electric assembly; 40: engine module; 41: engine; 42: warm air core; 43: PTC heat exchanger; 44: engine waterway; 50: first heat exchanger; 51: first heat exchange passage; 52: second heat exchange passage; 60: second heat exchanger; 61: third heat exchange passage; 62: fourth heat exchange passage;

70: control valve group; 71: first four-way valve; 710: first valve port; 711: second valve port; 712: third valve port; 713: fourth valve port; 72: second four-way valve; 720: fifth valve port; 721: sixth valve port; 722: seventh valve port; 723: eighth valve port; 73: third four-way valve; 730: ninth valve port; 731: tenth valve port; 732: eleventh valve port; and 733: twelfth valve port.

DETAILED DESCRIPTION

Embodiments of the present disclosure are described in detail below. The embodiments described with reference to the accompanying drawings are exemplary. The embodiments of the present disclosure are described in detail below.

A heat management system 1 according to the embodiments of the present disclosure is described below with reference to FIG. 1 to FIG. 5.

As shown in FIG. 1 to FIG. 5, the heat management system 1 according to the embodiments of the present disclosure includes: a heat pump module 10 (e.g., a heat pump), a battery module 20, an electric assembly module 30, a first heat exchanger 50, and a second heat exchanger 60. The heat pump module 10 provides refrigerating and heating for a passenger compartment of a vehicle 2, so that the passenger compartment has a good environment, and experience and comfort of a user are improved. The battery module 20 includes a battery 24, and the electric assembly module 30 includes an electric assembly 34. The battery 24 may provide electric energy to the electric assembly 34, and the electric assembly 34 works, to drive the vehicle 2 to move with the electric energy, and implement a pure electric or hybrid mode of the vehicle 2. The first heat exchanger 50 and the second heat exchanger 60 have a heat exchange function, and may absorb heat or dissipate heat.

As shown in FIG. 1 to FIG. 5, the first heat exchanger 50 has a first heat exchange passage 51 and a second heat exchange passage 52. The first heat exchange passage 51 is connected to the heat pump module 10, and the second heat exchange passage 52 is connected to the battery module 20. In other words, the heat pump module 10 may run independently, and the battery module 20 may also run independently. The first heat exchanger 50 may connect the heat pump module 10 and the battery module 20 together. In this way, a plurality of modes may be implemented between the heat pump module 10 and the battery module 20, to cope with different conditions.

As shown in FIG. 1 to FIG. 5, the second heat exchanger 60 has a third heat exchange passage 61 and a fourth heat exchange passage 62. The third heat exchange passage 61 is connected to the heat pump module 10, and the fourth heat exchange passage 62 is connected to the electric assembly module 30. In other words, the heat pump module 10 may run independently, and the electric assembly module 30 may also run independently. The second heat exchanger 60 may connect the heat pump module 10 and the electric assembly module 30 together. In this way, a plurality of modes may also be implemented between the heat pump module 10 and the electric assembly module 30, to cope with different conditions.

As shown in FIG. 1 to FIG. 5, the electric assembly module 30 includes: an electric assembly waterway 31 and a radiator waterway 32. An electric assembly 34 is arranged/disposed on the electric assembly waterway 31, a radiator 320 is arranged/disposed on the radiator waterway 32, the radiator waterway 32 is selectably in communication (e.g., in series) with the electric assembly waterway 31 (e.g., the radiator waterway 32 is in communication or not in communication with the electric assembly waterway 31), and the radiator waterway 32 is selectably in communication (e.g., in series) with the fourth heat exchange passage 62 (e.g., the radiator waterway 32 is in communication or not in communication with the fourth heat exchange passage 62).

The electric assembly 34 generates heat during working, and the radiator 320 on the radiator waterway 32 plays a role in the heat dissipation. In this way, the heat generated by the electric assembly 34 may be released into the air outside the vehicle 2 through the radiator 320. When the electric assembly module 30 exchanges heat with the heat pump module 10, heat emitted by the heat pump module 10 and the battery module 20 may also be released through the radiator waterway 32. In this way, integration of the heat management system 1 may be improved, and layout of the heat management system 1 may be facilitated. In addition, the radiator 320 is arranged, and an additional air refrigerating heat exchanger does not need to be arranged in the front cabin of the vehicle 2, thereby optimizing the arrangement and reducing the weight of the front cabin of the vehicle 2.

The radiator waterway 32 and the electric assembly waterway 31 are selectably in communication (e.g., in series), and the radiator waterway 32 and the fourth heat exchange passage 62 are selectably in communication (e.g., in series). In other words, the electric assembly waterway 31 and the fourth heat exchange passage 62 may be in communication in parallel. In this way, the electric assembly waterway 31 and the fourth heat exchange passage 62 are simultaneously in communication with the radiator waterway 32, or one of the electric assembly waterway 31 and the fourth heat exchange passage 62 is in communication with the radiator waterway 32, and the other of the electric assembly waterway 31 and the fourth heat exchange passage 62 is disconnected from the radiator waterway 32 or does not work, to form different modes.

As shown in FIG. 1 to FIG. 5, the battery module 20 includes a heat exchange waterway 23. The second heat exchange passage 52 is provided on the heat exchange waterway 23. The battery 24 generates heat during working. The second heat exchange passage 52 is provided on the heat exchange waterway 23, and the second heat exchange passage 52 is in communication with the first heat exchanger 50. The first heat exchanger 50 is in communication with the heat pump module 10 through the first heat exchange passage 51, and the heat pump module 10 is in communication with a radiator 320 on the radiator waterway 32. In this way, the heat generated by the battery 24 may be released through the radiator 320. The heat generated by the battery 24 may also be passed into the heat pump module 10 through the first heat exchanger 50 and released into the passenger compartment, to heat the passenger compartment and improve comfort of the user.

As shown in FIG. 1 and FIG. 2, when both a temperature of the passenger compartment and a temperature of the battery module 20 are high, the passenger compartment and battery module 20 are simultaneously in a refrigerating mode. The first heat exchanger 50 plays a role of an evaporator, and an internal waterway of the battery module 20 runs. The first heat exchanger 50 may absorb the heat generated in the battery module 20 through the second heat exchange passage 52, thereby refrigerating the battery module 20. In this case, a refrigerant in the first heat exchanger 50 absorbs the heat generated by the battery module 20. In addition, a heat absorption part of the heat pump module 10 works, and absorbs the heat in the passenger compartment, thereby refrigerating the passenger compartment. The heat pump module 10 is connected to the battery module 20 through the first heat exchanger 50. In this case, the refrigerant that is in the first heat exchanger 50 and that absorbs the heat generated by the battery module 20 may return to the heat pump module 10 through the first heat exchange passage 51. The refrigerant carries a large amount of heat, which may be released into the air outside the vehicle 2 together with the heat absorbed by the heat pump module 10. In this way, the temperature of the passenger compartment may be lowered, to improve driving comfort of the user, and the temperature of the battery module 20 may also be lowered, to prevent the battery module 20 from being damaged due to excessive heat.

When the temperature of the passenger compartment is suitable, but the battery module 20 generates a large amount of heat during working, it is a mode in which the battery module 20 is separately refrigerated. The first heat exchanger 50 plays a role of an evaporator, and an internal waterway of the battery module 20 runs. The first heat exchanger 50 may absorb the heat generated in the battery module 20 through the second heat exchange passage 52, thereby refrigerating the battery module 20. In this case, the refrigerant in the first heat exchanger 50 absorbs the heat generated by the battery module 20, but the heat pump module 10 does not refrigerate or heat the passenger compartment in this case. The heat pump module 10 is connected to the battery module 20 through the first heat exchanger 50. In this case, the refrigerant that is in the first heat exchanger 50 and that absorbs the heat generated by the battery module 20 may return to the heat pump module 10 through the first heat exchange passage 51. The refrigerant carries a large amount of heat, and separately releases the heat into the air outside the vehicle 2. In this way, the temperature of the battery module 20 may also be lowered, to prevent the battery module 20 from being damaged due to excessive heat.

When the vehicle 2 is in the electric mode, the heat generated by the battery module 20 is just right, and when the temperature of the passenger compartment is low, it is a mode in which the passenger compartment is heated, and excess heat generated by the battery module 20 is absorbed for heating. The first heat exchanger 50 plays a role of an evaporator, and an internal waterway of the battery module 20 runs. The refrigerant in first heat exchanger 50 may absorb the heat generated in the battery module 20 through the second heat exchange passage 52. In addition, a heat dissipation part of the heat pump module 10 works, and releases the heat into the passenger compartment, thereby heating the passenger compartment. The heat pump module 10 is connected to the battery module 20 through the first heat exchanger 50. In this case, the refrigerant that is in the first heat exchanger 50 and that absorbs the heat generated by the battery module 20 may return to the heat pump module 10 through the first heat exchange passage 51. The refrigerant carries a large amount of heat, and the heat is released into the passenger compartment through the heat pump module 10, to jointly heat the passenger compartment. In this way, the temperature of the passenger compartment may be quickly increased, to improve the driving comfort of the user. In this way, energy is fully made use of and energy loss is reduced.

As shown in FIG. 1 and FIG. 2, when the temperature of the passenger compartment is high, it is a mode in which the passenger compartment is separately refrigerated. The second heat exchanger 60 plays a role of a condenser. The heat pump module 10 runs, the heat absorption part of the heat pump module works and absorbs the heat in the passenger compartment, to refrigerate the passenger compartment, and the heat absorbed by the heat pump module 10 may be passed into the second heat exchanger 60 through the third heat exchange passage 61. The second heat exchanger 60 releases heat while the electric assembly module 30 also runs. The heat pump module 10 is connected to the electric assembly module 30 through the second heat exchanger 60, and the second heat exchanger 60 is in communication with the radiator waterway 32 through the fourth heat exchange passage 62. In this way, the heat released by the second heat exchanger 60 may be passed into the radiator waterway 32 through the fourth heat exchange passage 62, so that the heat released by the second heat exchanger 60 and the heat generated by the electric assembly module 30 may be jointly released into the air outside the vehicle 2 through the radiator 320. In this way, the temperature of the passenger compartment may be lowered, to improve driving comfort of the user.

When the vehicle 2 is in the electric mode, the heat generated by the electric assembly module 30 is just right, and when the temperature of the passenger compartment is low, it is a mode in which the passenger compartment is heated, and excess heat generated by the electric assembly module 30 is absorbed for heating. The second heat exchanger 60 plays a role of an evaporator, and the heat pump module 10 runs. The heat release part of the heat pump module 10 runs and releases the heat into the passenger compartment, to heat the passenger compartment. In addition, the electric assembly module 30 also runs, and the heat generated by the electric assembly module 30 may be passed into the second heat exchanger 60 through the fourth heat exchange passage 62. In this case, the refrigerant in the second heat exchanger 60 absorbs the heat generated by the electric assembly module 30, and the heat pump module 10 is connected to the electric assembly module 30 through the second heat exchanger 60. In this case, the refrigerant in the second heat exchanger 60 that absorbs the heat generated by the electric assembly module 30 may return to the heat pump module 10 through the third heat exchange passage 61. The refrigerant carries a large amount of heat and then releases the heat into the passenger compartment, to jointly heat the passenger compartment. In this way, the temperature of the passenger compartment may be quickly increased, to improve the driving comfort of the user. In this way, energy is fully made use of and energy loss is reduced.

It should be noted that if the heat generated by the electric assembly module 30 is low or just right, the excess heat generated by the electric assembly module 30 does not need to be released into the air outside the vehicle 2. If the electric assembly module 30 generates a large amount of heat, the excess heat generated by the electric assembly module 30 needs to be released into the air outside the vehicle 2. In this way, the electric assembly module 30 may be prevented from being damaged due to excessive heat generation, so that the electric assembly module 30 may work effectively for a long time.

When the vehicle 2 is in the electric mode, the heat generated by the battery module 20 and the electric assembly module 30 is insufficient, and when the temperature of the passenger compartment is low, it is a mode in which the passenger compartment is heated, and the electric assembly module 30 absorbs the heat of the air outside the vehicle 2 for heating. The second heat exchanger 60 plays a role of an evaporator, and the heat pump module 10 runs. The heat pump module 10 condenses and generates heat, and releases the heat into the passenger compartment, to heat the passenger compartment. In addition, the electric assembly module 30 also runs, but the heat generated by the electric assembly module 30 is very low and cannot effectively provide heat. In this case, the electric assembly module 30 may absorb the heat of the air outside the vehicle 2, and pass the absorbed heat of the air outside the vehicle 2 into the second heat exchanger 60 through the fourth heat exchange passage 62. In this case, the refrigerant in the second heat exchanger 60 absorbs the heat from the air outside the vehicle 2, and the heat pump module 10 is connected to the electric assembly module 30 through the second heat exchanger 60. In this case, the refrigerant that is in the second heat exchanger 60 and that absorbs heat from the air outside the vehicle 2 may return to the heat pump module 10 through the third heat exchange passage 61. The refrigerant carries a large amount of heat and then releases the heat into the passenger compartment, to jointly heat the passenger compartment. In this way, the temperature of the passenger compartment may be increased, to improve the driving comfort of the user. In this way, heat exchange with the air outside the vehicle 2 may be utilized, and the heat exchange effect is good.

When the passenger compartment and the battery module 20 are simultaneously in the mode of being refrigerated or the battery module 20 is in the mode of being separately refrigerated, the generated heat is released into the air outside the vehicle 2 through the radiator 320 of the electric assembly module 30.

Therefore, the first heat exchanger 50 is connected to the battery module 20, so that heat generated by the battery module 20 may be released through the first heat exchanger 50, to prevent the battery module 20 from being damaged due to excessive heating. The heat pump module 10 and the electric assembly module 30 are simultaneously connected to the second heat exchanger 60, so that the heat pump module 10 may release heat through the electric assembly module 30, and may also absorb heat through the electric assembly module 30. In this way, integration is high and arrangement is easy. By adjusting a communication manner between passages, heat emitted by the engine module 40 may heat the battery module 20. In this way, the battery module 20 may have a better working environment, so that the battery module may work better, and may make full use of energy, and reduce energy loss. In addition, the second heat exchanger 60 is arranged. In this way, an air refrigerating heat exchanger does not need to be arranged in a front cabin of a vehicle 2, which optimizes the arrangement and reduces the weight of the front cabin of the vehicle 2.

As shown in FIG. 1 to FIG. 5, the heat pump module 10 includes: a compressor 11, a gas-liquid separator 14, a refrigerating pipeline 15, a heating pipeline 16, a first heat exchange pipeline 17, a first switching pipeline 19, and a second heat exchange pipeline 21. A condenser module 12 (e.g., a condenser) is arranged on the heating pipeline 16, and an evaporator module 13 (e.g., an evaporator) is arranged on the refrigerating pipeline 15. A third heat exchange passage 61 is provided on the first heat exchange pipeline 17, and a first heat exchange passage 51 is provided on the second heat exchange pipeline 21. The compressor 11, the heating pipeline 16, the first heat exchange pipeline 17, the refrigerating pipeline 15, and the gas-liquid separator 14 are sequentially connected. The first switching pipeline 19, the second heat exchange pipeline 21, and the refrigerating pipeline 15 are connected in parallel, and the refrigerating pipeline 15, the first switching pipeline 19, and the second heat exchange pipeline 21 are selectably in communication (e.g., in series) between the first heat exchange pipeline 17 and the gas-liquid separator 14.

The compressor 11 is mainly configured to compress the refrigerant, and upgrade the refrigerant from low-pressure air to high-pressure air. The condenser module 12 mainly converts a gaseous refrigerant into a liquid refrigerant, thereby releasing heat. The evaporator module 13 mainly converts the liquid refrigerant into the gaseous refrigerant, thereby absorbing heat. The gas-liquid separator 14 may separate the gaseous refrigerant and the liquid refrigerant, thereby preventing the liquid refrigerant from entering the compressor 11, and causing the compressor 11 to fail to work normally. The first heat exchange pipeline 17 is mainly connected to the second heat exchanger 60, and both the refrigerating pipeline 15 and the heating pipeline 16 may be in communication with the second heat exchanger 60, so that the evaporator module 13 or the condenser module 12 may form a refrigerating or heating circulation with the second heat exchanger 60. The second heat exchange pipeline 21 is mainly connected to the first heat exchanger 50, so that the battery module 20 may be in communication with the heat pump module through the second heat exchange pipeline 21.

The condenser module 12 is arranged on the heating pipeline 16, and the evaporator module 13 is arranged on the refrigerating pipeline 15. The condenser module 12 may release heat into the heating pipeline 16, so that a heating effect may be implemented, and the evaporator module 13 may absorb heat to the refrigerating pipeline 15, so that a refrigerating effect may be implemented. The third heat exchange passage 61 is provided in the first heat exchange pipeline 17. In some embodiments, the first heat exchange pipeline 17 may be directly connected to the second heat exchanger 60, so that the first heat exchange pipeline 17 may play the role of heat exchange. The compressor 11, the heating pipeline 16, the first heat exchange pipeline 17, the refrigerating pipeline 15, and the gas-liquid separator 14 are connected. In this way, the heat pump module 10 may form an internal circulation, and the first switching pipeline 19, the second heat exchange pipeline 21, and the refrigerating pipeline 15 are connected in parallel. Moreover, the refrigerating pipeline 15, the first switching pipeline 19, and the second heat exchange pipeline 21 may be selectably in communication (e.g., in series) between the first heat exchange pipeline 17 and the gas-liquid separator 14. In other words, the first heat exchange pipeline 17 and the gas-liquid separator 14 may selectively be in communication with the first switching pipeline 19, the second heat exchange pipeline 21, and the refrigerating pipeline 15. In this way, the refrigerating circulation and the heating circulation of the heat pump module 10 may be implemented, and connection and cooperation between the heat pump module 10 and other modules may be implemented.

The heat pump module 10 has a refrigerating mode, a heating mode, and a battery refrigerating mode. The following provides a detailed description of the refrigerating mode, the heating mode, and the battery refrigerating mode of the heat pump module 10.

When being in the refrigerating mode, the refrigerant sequentially passes through the compressor 11, the heating pipeline 16, the first heat exchange pipeline 17, the refrigerating pipeline 15, and the gas-liquid separator 14. In an embodiment, under compression of the compressor 11, the refrigerant forms a high-pressure gaseous refrigerant, and the high-pressure gaseous refrigerant passes through the heating pipeline 16, but the condenser module 12 on the heating pipeline 16 does not work, and the high-pressure gaseous refrigerant continues to pass through the first heat exchange pipeline 17. Because the first heat exchange pipeline 17 is connected to the second heat exchanger 60, the high-pressure gaseous refrigerant is passed into the second heat exchanger 60. In this case, the second heat exchanger 60 plays a role of a condenser, the second heat exchanger 60 releases heat, and the second heat exchanger 60 is in communication with the radiator waterway 32 through the fourth heat exchange passage 62. In this way, the heat released by the second heat exchanger 60 may be passed into the radiator waterway 32 through the fourth heat exchange passage 62, and the heat may be released into the air outside the vehicle 2 through the radiator 320, so that the high-pressure gaseous refrigerant in the second heat exchanger 60 may release a large amount of heat, to form a liquid refrigerant. Then the liquid refrigerant is passed into the evaporator module 13 of the refrigerating pipeline 15, and the evaporator module 13 on the refrigerating pipeline 15 works. The evaporator module 13 evaporates and absorbs the heat in the passenger compartment, to refrigerate the passenger compartment, so that the liquid refrigerant in the evaporator module 13 absorbs the heat to form the low-pressure gaseous refrigerant. The low-pressure gaseous refrigerant flows into the gas-liquid separator 14, and the gas-liquid separator 14 separates the liquid refrigerant doped in the low-pressure gaseous refrigerant. Finally, the low-pressure gaseous refrigerant is passed into the compressor 11, and the compressor 11 compresses the low-pressure gaseous refrigerant. In this way, the heat pump module 10 may form a refrigerating circulation, and may cool the passenger compartment consistently.

When being in the heating mode, the refrigerant sequentially passes through the compressor 11, the heating pipeline 16, the first heat exchange pipeline 17, the first switching pipeline 19, and the gas-liquid separator 14. In an embodiment, under compression of the compressor 11, the refrigerant forms a high-pressure gaseous refrigerant. The high-pressure gaseous refrigerant is passed into the condenser module 12 of the heating pipeline 16, and the condenser module 12 on the heating pipeline 16 works. The condenser module 12 releases a large amount of heat into the passenger compartment, to heat the passenger compartment, so that the high-pressure gaseous refrigerant in the condenser module 12 releases a large amount of heat, to form a liquid refrigerant, and the liquid refrigerant continues to pass through the first heat exchange pipeline 17. Because the first heat exchange pipeline 17 is connected to the second heat exchanger 60, the liquid refrigerant is passed into the second heat exchanger 60. In this case, the second heat exchanger 60 plays a role of an evaporator. The second heat exchanger 60 absorbs the heat in the air outside the vehicle 2 or the heat generated in each module through the electric assembly module 30, so that the liquid refrigerant in the second heat exchanger 60 may absorb a large amount of heat, and form the low-pressure gaseous refrigerant. Then the low-pressure gaseous refrigerant is passed into the gas-liquid separator 14 through the first switching pipeline 19, and the gas-liquid separator 14 separates the liquid refrigerant doped in the low-pressure gaseous refrigerant. Finally, the low-pressure gaseous refrigerant is passed into the compressor 11, and the compressor 11 compresses the low-pressure gaseous refrigerant. In this way, the heat pump module 10 may form a heating circulation, and may heat the passenger compartment consistently.

When being in the battery refrigerating mode, the refrigerant sequentially passes through the compressor 11, the heating pipeline 16, the first heat exchange passage 51, and the gas-liquid separator 14. In other words, when the passenger compartment is in the heating mode, the excess heat of the battery module 20 is absorbed for heating. In an embodiment, under compression of the compressor 11, the refrigerant forms a high-pressure gaseous refrigerant. The high-pressure gaseous refrigerant is passed into the condenser module 12 of the heating pipeline 16, and the condenser module 12 on the heating pipeline 16 works. The condenser module 12 releases a large amount of heat into the passenger compartment, to heat the passenger compartment, so that the high-pressure gaseous refrigerant in the condenser module 12 releases a large amount of heat, to form a liquid refrigerant, and the liquid refrigerant continues to enter the first heat exchange passage 51. Because the first heat exchange passage 51 is connected to the first heat exchanger 50, the liquid refrigerant is passed into the first heat exchanger 50. In this case, the first heat exchanger 50 plays a role of an evaporator. In addition, the battery module 20 generates a large amount of heat during working, and the first heat exchanger 50 absorbs the large amount of heat generated by the battery module 20, so that the battery module 20 may be cooled down, and the liquid refrigerant in the first heat exchanger 50 absorbs the large amount of heat, to form the low-pressure gaseous refrigerant. Then the low-pressure gaseous refrigerant is passed into the gas-liquid separator 14, and the gas-liquid separator 14 separates the liquid refrigerant doped in the low-pressure gaseous refrigerant. Finally, the low-pressure gaseous refrigerant is passed into the compressor 11, and the compressor 11 compresses the low-pressure gaseous refrigerant. In this way, the passenger compartment may be heated continuously, to improve driving comfort of the user, and the temperature of the battery module 20 may also be lowered, to prevent the battery module 20 from being damaged due to excessive heat. In this way, energy is fully made use of, and energy loss is reduced.

Further, as shown in FIG. 1 to FIG. 5, the battery module 20 further includes a battery waterway 22. In other words, the heat management system 1 includes a battery waterway 22, and a battery 24 is arranged on the battery waterway 22; and the heat management system 1 further includes: a control valve group 70. The control valve group 70 may play a role of controlling and connecting, so that the battery module 20 is selectably in communication with the electric assembly module 30, to implement a plurality of modes, and cope with different conditions. The control valve group 70 is connected to the battery waterway 22, the electric assembly waterway 31, the radiator waterway 32, and the heat exchange waterway 23. This facilitates the control valve group 70 to control the connection between the battery waterway 22, the electric assembly waterway 31, the radiator waterway 32, and the heat exchange waterway 23, and the control valve group 70 is switchable or configured to switch between the first state and the second state. In other words, when the control valve group 70 is in the first state and the second state, the connection and cooperation between the battery module 20 and the electric assembly module 30 are different, and the connection between the battery module 20 and the electric assembly module 30 may be switched, so that a plurality of different modes may be implemented, to cope with different conditions of the vehicle 2. A plurality of modes of the heat management system 1 are connection and cooperation relationships between the heat pump module 10, the battery module 20, and the electric assembly module 30 when the control valve group 70 is in a third state.

The following provides a detailed description of a connection relationship between the battery module 20 and the electric assembly module 30 when the control valve group 70 is in the first state and the second state.

When the control valve group 70 is in the first state, the radiator waterway 32 is in communication in series with the electric assembly waterway 31 or the fourth heat exchange passage 62 (in other words, one of the electric assembly waterway 31 and the fourth heat exchange passage 62 is in communication with the radiator waterway 32), and/or the battery waterway 22 is in communication in series with the heat exchange waterway 23. In other words, when the control valve group 70 is in the first state, the radiator waterway 32 is in communication in series with the electric assembly waterway 31 or the fourth heat exchange passage 62; or the battery waterway 22 is in communication in series with the heat exchange waterway 23; or the radiator waterway 32 is in communication in series with the electric assembly waterway 31 or the fourth heat exchange passage 62, and the battery waterway 22 is in communication in series with the heat exchange waterway 23. If the radiator waterway 32 is separately in communication in series with the electric assembly waterway 31, it is a mode in which the electric assembly waterway 31 separately dissipates heat through the radiator waterway 32. If the radiator waterway 32 is separately in communication in series with the fourth heat exchange passage 62, it is a mode in which the heat pump module 10 separately dissipates heat through the radiator waterway 32. If the battery waterway 22 is separately in communication in series with the heat exchange waterway 23, it is a mode in which the battery waterway 22 separately runs.

When the control valve group 70 is in the second state, the battery waterway 22 is in communication in series with the electric assembly waterway 31 or the fourth heat exchange passage 62 (in other words, one of the electric assembly waterway 31 and the fourth heat exchange passage 62 is in communication in series with the battery waterway 22). If the battery waterway 22 is separately in communication in series with the electric assembly waterway 31, it is a mode in which the electric assembly waterway 31 heats the battery waterway 22. If the battery waterway 22 is separately in communication in series with the fourth heat exchange passage 62, it is a mode in which the battery waterway 22 provides heat for the heat pump module 10.

The electric assembly module 30 and the battery module 20 are connected in series. In other words, when the vehicle 2 is in the electric mode, the heat of the electric assembly module 30 is high, and when the temperature of the battery module 20 is low, the excess heat of the electric assembly module 30 may be used to heat the battery module 20. In this case, the control valve group 70 is in the second state, and the control valve group 70 may control the connection between the electric assembly module 30 and the battery module 20. In an embodiment, the electric assembly module 30 generates heat during running. In this case, the electric assembly module 30 is connected to the battery module 20, and the heat generated by the electric assembly module 30 may be passed into the battery module 20, thereby heating the battery module 20, so that the battery module 20 has a good working environment, and may work better. In this way, energy may be fully made use of, and energy loss may be reduced.

As shown in FIG. 2, a positive-temperature-coefficient (PTC, positive temperature coefficient thermistor heater) heat exchanger 43 and/or an exhaust gas heat exchanger are further arranged in the heat management system 1, and the PTC heat exchanger 43 and/or the exhaust gas heat exchanger are connected between the battery module 20 and the electric assembly module 30. When the control valve group 70 is in the second state, the battery module 20 may also be connected in series with the PTC heat exchanger 43 and/or the exhaust gas heat exchanger, and the battery module 20 may be disconnected from the electric assembly module 30. In an embodiment, the PTC heat exchanger 43 and/or the exhaust gas heat exchanger generate heat. In this case, the PTC heat exchanger 43 and/or the exhaust gas heat exchanger are connected to the battery module 20, and the heat generated by the PTC heat exchanger 43 and/or the exhaust gas heat exchanger may be passed into the battery module 20, thereby heating the battery module 20, so that the battery module 20 has a good working environment, and may work better. The PTC heat exchanger 43 and/or the exhaust gas heat exchanger may also simultaneously heat the electric assembly module 30 and the heat pump module 10. When other modules need to be heated, the PTC heat exchanger 43 and/or the exhaust gas heat exchanger may also be turned on to provide heat for the module when necessary.

In some embodiments, as shown in FIG. 1 to FIG. 5, the heat management system 1 further includes an engine waterway 44. An engine 41 is arranged on the engine waterway 44, the first state of the control valve group 70 includes a first sub-state and a second sub-state, and the second state of the control valve group 70 includes a third sub-state and a fourth sub-state. When the control valve group 70 is in the first sub-state, the electric assembly waterway 31 or the fourth heat exchange passage 62 and the radiator waterway 32 are in communication in series sequentially; when the control valve group is in the second sub-state, (1) the electric assembly waterway 31 or the fourth heat exchange passage 62, (2) the radiator waterway 32, and (3) the engine waterway 44 are in communication in series sequentially; when the control valve group is in the third sub-state, the electric assembly waterway 31 or the fourth heat exchange passage 62 and the battery waterway 22 are in communication in series; and when the control valve group is in the fourth sub-state, (1) the electric assembly waterway 31 or the fourth heat exchange passage 62, (2) the battery waterway 22, and (3) the engine waterway 44 are in communication in series. In this way, the heat management system 1 may have more modes, to cope with more different conditions.

For example, an engine 47 in the engine module 40 uses combustion oil as energy to perform driving, to implement movement of the vehicle 2, and the control valve group 70 may play a role of controlling and connecting, so that the battery module 20, the electric assembly module 30, and the engine module 40 are selectably in communication.

The engine module 40 and the electric assembly module 30 are connected in series. In other words, when the vehicle 2 is in a hybrid mode, and the heat of the engine module 40 is high, and when the temperature of the electric assembly module 30 is low, the excess heat of the engine module 40 may be used to heat the electric assembly module 30. In an embodiment, the engine module 40 generates heat during running. In this case, the engine module 40 is connected to the electric assembly module 30, and the heat generated by the engine module 40 may be passed into the electric assembly module 30, thereby heating the electric assembly module 30, so that the electric assembly module 30 has a good working environment, and may work better. In this way, energy may be fully made use of, and energy loss may be reduced.

The third heat exchange passage 61 of the second heat exchanger 60 is connected to the heat pump module 10, the fourth heat exchange passage 62 is connected to the electric assembly module 30, and the fourth heat exchange passage 62 is also connected to the engine module 40. When the control valve group 70 is in the first state, the engine module 40 and the heat pump module 10 may also be connected in series and disconnected from the electric assembly module 30. In an embodiment, when the vehicle 2 is in the hybrid mode, the heat generated by the engine module 40 is just right, and when the temperature of the passenger compartment is low, the heat emitted by the engine module 40 heats the passenger compartment. The second heat exchanger 60 may play a role of an evaporator. When the engine module 40 runs, the heat generated by the engine module 40 may be passed into the second heat exchanger 60 through the fourth heat exchange passage 62. In this case, the refrigerant in the second heat exchanger 60 absorbs the heat generated by the engine module 40. In addition, the heat pump module 10 also runs. The heat pump module 10 condenses and releases heat, and the heat is passed into the passenger compartment. In this case, the refrigerant that is in the second heat exchanger 60 and that absorbs the heat generated by the engine module 40 may return to the heat pump module 10 through the third heat exchange passage 61, so that the heat pump module 10 may form a heating circulation. In this way, the passenger compartment may be heated consistently and quickly, so that the driving comfort of the user may be improved. In this way, energy may be fully made use of, and energy loss is reduced. In addition, in the mode, a cooling temperature of the engine module 40 is greater than a cooling temperature of the electric assembly module 30, and a cooling temperature of the electric assembly module 30 is greater than an ambient temperature.

It should be noted that if the heat generated by the engine module 40 is low or just right, the excess heat generated by the engine module 40 does not need to be released into the air outside the vehicle 2. If the engine module 40 generates a large amount of heat, the excess heat generated by the engine module 40 needs to be released into the air outside the vehicle 2. In this way, the engine module 40 may be prevented from being damaged due to excessive heat generation, so that the engine module 40 may work effectively for a long time.

Figure 5:
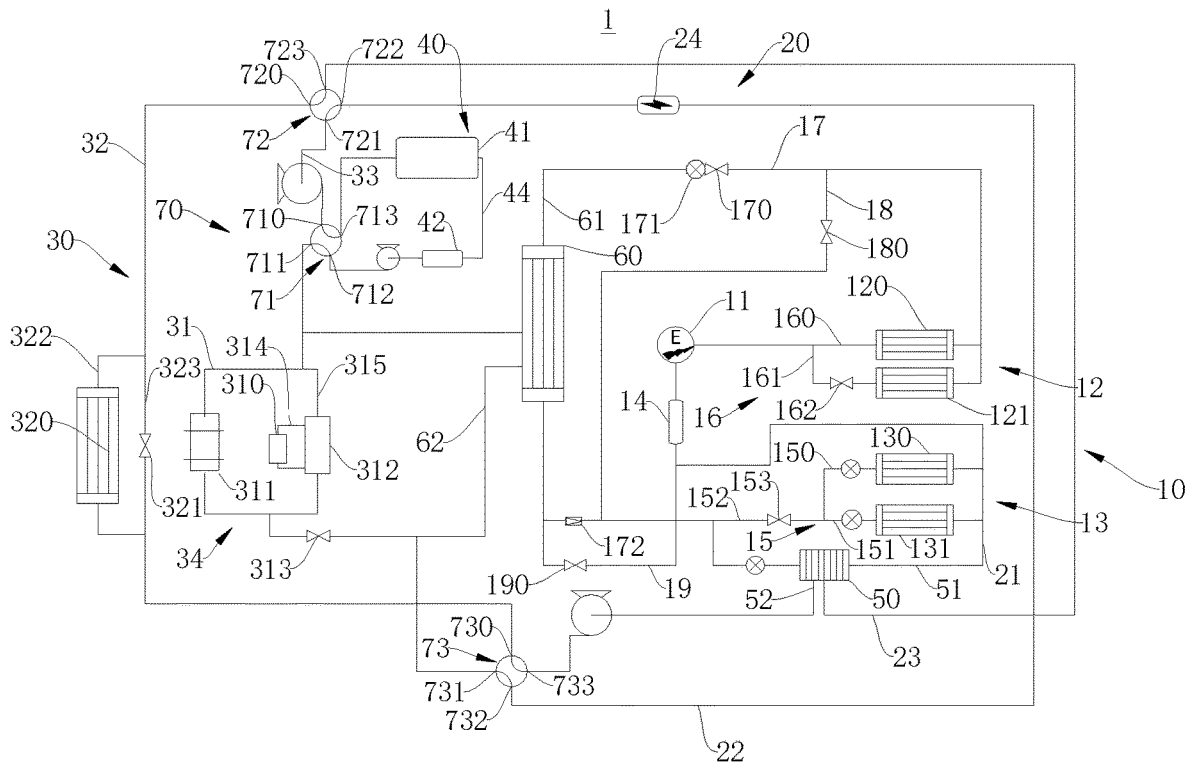
FIG. 5 is a schematic diagram of a fourth connection of a structure of a heat management system according to an embodiment of the present disclosure.

In addition, as shown in FIG. 5, the engine module 40 and the battery module 20 are connected in series. When the vehicle 2 is in the hybrid mode, the heat generated by the engine module 40 is just right. Moreover, when the temperature of the battery module 20 is low, the heat emitted by the engine module 40 heats the battery module 20. In this case, the control valve group 70 is in the third state, and the control valve group 70 may control the engine module 40 to be connected to the battery module 20. In an embodiment, the engine module 40 generates heat during running. In this case, the engine module 40 is connected to the battery module 20, and the heat generated by the engine module 40 may be passed into the battery module 20, thereby heating the battery module 20, so that the battery module 20 has a better working environment, and may work better. In this way, energy may be fully made use of, and energy loss may be reduced.

Further, as shown in FIG. 1 to FIG. 5, the control valve group 70 includes: a first four-way valve 71, a second four-way valve 72, and a third four-way valve 73. The first four-way valve 71 has a first valve port 710, a second valve port 711, a third valve port 712, and a fourth valve port 713. The first valve port 710 and the second valve port 711 are respectively arranged at one end (e.g., a first end) of the electric assembly waterway 31 and one end (e.g., a first end) of the radiator waterway 32. The third valve port 712 and the fourth valve port 713 are arranged on the engine waterway 44. The second four-way valve 72 has a fifth valve port 720, a sixth valve port 721, a seventh valve port 722, and an eighth valve port 723. The fifth valve port 720 and the sixth valve port 721 are respectively arranged on the radiator waterway 32. The seventh valve port 722 and the eighth valve port 723 are arranged on the battery waterway 22. The third four-way valve 73 has a ninth valve port 730, a tenth valve port 731, an eleventh valve port 732, and a twelfth valve port 733. The ninth valve port 730 and the tenth valve port 731 are arranged at the other end (e.g., a second end) of the electric assembly waterway 31 and the other end (e.g., a second end) of the radiator waterway 32. The eleventh valve port 732 and the twelfth valve port 733 are arranged on the battery waterway 22.

In other words, when the first valve port 710 and the second valve port 711 of the first four-way valve 71 are in communication with each other, the fifth valve port 720 and the sixth valve port 721 of the second four-way valve 72 are in communication with each other, and the ninth valve port 730 and the tenth valve port 731 of the third four-way valve 73 are in communication with each other, the electric assembly module 30 is in communication as a whole. When the third valve port 712 and the fourth valve port 713 of the first four-way valve 71 are in communication with each other, the engine module 40 is in communication as a whole. When the seventh valve port 722 and the eighth valve port 723 of the second four-way valve 72 are connected to the eleventh valve port 732 and the twelfth valve port 733 of the third four-way valve 73, the battery module 20 is in communication as a whole. The valve ports arranged in the electric assembly module 30, the engine module 40, and the battery module 20 may also be selectively connected to other valve ports, so that the modules may be connected to each other, to form a plurality of modes.

As shown in FIG. 1 and FIG. 2, when the control valve group 70 is in the first sub-state, the first valve port 710 is in communication with the second valve port 711, the third valve port 712 is in communication with the fourth valve port 713, the fifth valve port 720 is in communication with the sixth valve port 721, the seventh valve port 722 is in communication with the eighth valve port 723, the ninth valve port 730 is in communication with the tenth valve port 731, and the eleventh valve port 732 is in communication with the twelfth valve port 733. In this way, the electric assembly module 30, the engine module 40, and the battery module 20 may all run separately. The heat of the heat pump module 10 and/or the battery module 20 may be passed into the electric assembly module 30, and then released into the air outside the vehicle 2 through the radiator 320, and the heat in the air outside the vehicle 2 may also be absorbed through the radiator 320.

Figures 3, 4:
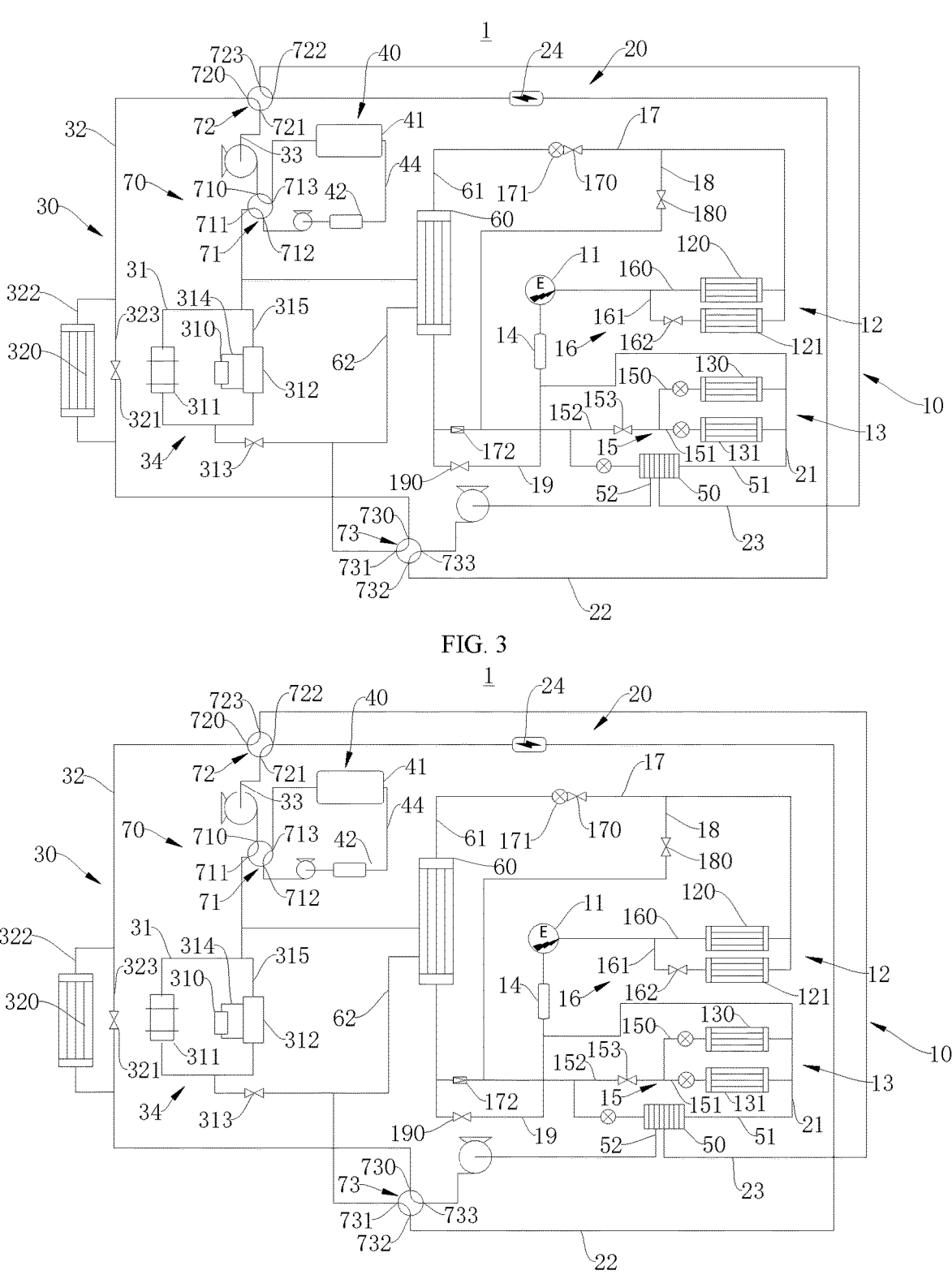
FIG. 3 is a schematic diagram of a second connection of a structure of a heat management system according to an embodiment of the present disclosure.
FIG. 4 is a schematic diagram of a third connection of a structure of a heat management system according to an embodiment of the present disclosure.

As shown in FIG. 3, when the control valve group 70 is in the second sub-state, the first valve port 710 is in communication with the fourth valve port 713, the second valve port 711 is in communication with the third valve port 712, the fifth valve port 720 is in communication with the sixth valve port 721, the seventh valve port 722 is in communication with the eighth valve port 723, the ninth valve port 730 is in communication with the tenth valve port 731, and the eleventh valve port 732 is in communication with the twelfth valve port 733. In this way, the electric assembly module 30 may be in communication as a whole, and the electric assembly module 30 and the engine module 40 may be connected in series through adjustment of the first four-way valve 71, so that the heat generated by the engine module 40 may be passed into the electric assembly module 30, thereby heating the electric assembly module 30, so that the electric assembly module 30 has a good working environment, and may work better. In this way, energy may be fully made use of, and energy loss may be reduced.

As shown in FIG. 4, when the control valve group 70 is in the third sub-state, the first valve port 710 is in communication with the second valve port 711, the third valve port 712 is in communication with the fourth valve port 713, the fifth valve port 720 is in communication with the eighth valve port 723, the sixth valve port 721 is in communication with the seventh valve port 722, the ninth valve port 730 is in communication with the twelfth valve port 733, and the tenth valve port 731 is in communication with the eleventh valve port 732. In this way, the electric assembly module 30 may be in communication partially, and the electric assembly module 30 and the battery module 20 may be connected in series through adjustment of the second four-way valve 72 and the third four-way valve 73, so that the heat generated by the electric assembly module 30 may be passed into the battery module 20, thereby heating the battery module 20, so that the battery module 20 has a good working environment, and may work better. In this way, energy may be fully made use of, and energy loss may be reduced.

As shown in FIG. 5, when the control valve group 70 is in the fourth sub-state, the first valve port 710 is in communication with the fourth valve port 713, the second valve port 711 is in communication with the third valve port 712, the fifth valve port 720 is in communication with the eighth valve port 723, the sixth valve port 721 is in communication with the seventh valve port 722, the ninth valve port 730 is in communication with the twelfth valve port 733, and the tenth valve port 731 is in communication with the eleventh valve port 732. In this way, the engine module 40 may be in communication as a whole, and the engine module 40 and the battery module 20 may be connected in series through adjustment of the first four-way valve 71, the second four-way valve 72, and the third four-way valve 73, so that the heat generated by the engine module 40 may be passed into the battery module 20, thereby heating the battery module 20, so that the battery module 20 has a good working environment, and may work better. In this way, energy may be fully made use of, and energy loss may be reduced.

In addition, as shown in FIG. 1 to FIG. 5, the electric assembly module 30 further includes: a pump waterway 33. The first valve port 710 and the second valve port 711 are respectively arranged on the pump waterway 33 and the electric assembly waterway 31. The fifth valve port 720 and the sixth valve port 721 are respectively arranged on the radiator waterway 32 and the pump waterway 33. The ninth valve port 730 and the tenth valve port 731 are respectively arranged on the radiator waterway 32 and the electric assembly waterway 31. The electric assembly waterway 31 is a main drive circuit of the electric assembly module 30. The electric assembly waterway 31 generates heat during working. The radiator waterway 32 mainly plays a role of heat dissipation. The heat generated by the electric assembly waterway 31 may be released into the air outside the vehicle 2 through the radiator waterway 32. When the electric assembly module 30 is connected to the heat pump module 10, the heat emitted by the heat pump module 10 and the battery module 20 may also be released through the radiator waterway 32. The pump waterway 33 mainly pumps water to form a waterway circulation, and the heat generated by the electric assembly waterway 31 may enter the waterway circulation, so that the heat generated by the electric assembly waterway 31 may be more conveniently released through the radiator waterway 32, or the heat may be passed into other modules, to heat other modules.

The first valve port 710 and the second valve port 711 are respectively arranged on the pump waterway 33 and the electric assembly waterway 31. If the first valve port 710 is in communication with the second valve port 711, the pump waterway 33 is in communication with the electric assembly waterway. If the first valve port 710 is in communication with the fourth valve port 713, the second valve port 711 is in communication with the third valve port 712. In this way, the engine module 40 is further connected in series between the pump waterway 33 and the electric assembly waterway 31. The fifth valve port 720 and the sixth valve port 721 are respectively arranged on the radiator waterway 32 and the pump waterway 33. If the fifth valve port 720 is in communication with the sixth valve port 721, the radiator waterway 32 is in communication with the pump waterway 33. If the fifth valve port 720 is in communication with the eighth valve port 723, the sixth valve port 721 is in communication with the seventh valve port 722. In this way, the radiator waterway 32 may be disconnected, so that the pump waterway 33 and the battery module 20 is connected in series. The ninth valve port 730 and the tenth valve port 731 are respectively arranged on the radiator waterway 32 and the electric assembly waterway 31. If the ninth valve port 730 is in communication with the tenth valve port 731, the radiator waterway 32 is in communication with the electric assembly waterway 31. If the ninth valve port 730 is in communication with the twelfth valve port 733, the tenth valve port 731 is in communication with the eleventh valve port 732. Similarly, in this way, the radiator waterway 32 may be disconnected, so that the electric assembly waterway 31 and the battery module 20 may be connected in series. In this way, by adjusting valve ports of the first four-way valve 71, the second four-way valve 72, and the third four-way valve 73, the electric assembly module 30, the engine module 40, and the battery module 20 may be selectively connected, thereby forming a plurality of modes, to cope with different conditions.

In an embodiment, as shown in FIG. 1 to FIG. 5, the electric assembly 34 includes: a motor 310, a motor controller 311, and a third heat exchanger 312. The third heat exchanger 312 has a fifth heat exchange passage 314 and a sixth heat exchange passage 315. The motor 310 is connected to the fifth heat exchange passage 314, and the motor controller 311 and the third heat exchanger 312 are connected in parallel. The third heat exchanger 312 may be an oil cooler. Because the oil has heat conductivity, the third heat exchanger 312 may cool a crankcase, a clutch, and a valve assembly of the engine 41 of the vehicle 2 through which the oil passes. The motor 310 mainly plays a role of driving, thereby driving the vehicle 2 to move, while the motor controller 311 may play a role of controlling, thereby controlling running of the motor 310. The motor 310 is connected to the fifth heat exchange passage 314, and the motor controller 311 and the third heat exchanger 312 are connected in parallel. When the electric assembly module 30 runs on a waterway, the heat generated by the motor 310 and the motor controller 311 during working may be collected into the waterway, so that the heat may be released through the radiator waterway 32, or the heat may be passed into other modules, to heat other modules.

Further, as shown in FIG. 1 to FIG. 5, a first two-way valve 313 is arranged on the electric assembly waterway 31, and the first two-way valve 313 controls the electric assembly waterway 31 to be in communication or out of communication between the sixth valve port 721 of the second four-way valve 72 and the ninth valve port 730 of the third four-way valve 73. The first two-way valve 313 may play a role of out of communication and communication. When the electric assembly waterway 31 and the fourth heat exchange passage 62 are in communication in parallel, the first two-way valve 313 is in a communication state. When the electric assembly waterway 31 is in communication and the fourth heat exchange passage 62 is disconnected, or when the fourth heat exchange passage 62 is in communication, but the second heat exchanger 60 does not work, the first two-way valve 313 is in a communication state. When the electric assembly waterway 31 is disconnected, and the fourth heat exchange passage 62 is in communication, the first two-way valve 313 is in a disconnected state. In this way, by adjusting the first two-way valve 313, connection and disconnection of the electric assembly waterway 31 may be controlled, thereby forming a plurality of modes, to cope with different conditions.

As shown in FIG. 1 to FIG. 5, the radiator waterway 32 includes a radiator branch 322 and a connected branch 323, the radiator 320 is arranged on the radiator branch 322, the radiator branch 322 and the connected branch 323 are connected in parallel, and the radiator branch 322 and the connected branch 323 are switchable between a communication state and an out-of-communication state respectively. It should be noted that a sixth two-way valve 321 is arranged on the connected branch 323, and the radiator 320 and the sixth two-way valve 321 are connected in parallel. Similarly, the sixth two-way valve 321 may also play the role of disconnection and communication. When the electric assembly waterway 31 needs to dissipate heat, or the heat pump module 10 and the battery module 20 need to dissipate heat, the radiator 320 is in communication, and the sixth two-way valve 321 is disconnected. In this way, the heat may be released through the radiator 320. When the heat generated by the electric assembly waterway 31 and/or the engine module 40 heats other modules, the radiator 320 is disconnected and the sixth two-way valve 321 is in communication. In this way, heat may be prevented from being released from the radiator 320. When the electric assembly waterway 31 and/or the engine module 40 generate too much heat, the radiator 320 also needs to be turned on. In this way, the excess heat may be released through the radiator 320, to prevent the electric assembly waterway 31 and/or the engine module 40 from being damaged due to excessive heat.

According to some optional embodiments of the present disclosure, as shown in FIG. 1 to FIG. 5, the heat pump module 10 includes: a compressor 11, a condenser module 12, an evaporator module 13, a gas-liquid separator 14, a refrigerating pipeline 15, a heating pipeline 16, a first heat exchange pipeline 17, a second heat exchange pipeline 21, a second switching pipeline 18, and a first switching pipeline 19. The condenser module 12 is arranged on the heating pipeline 16, and the evaporator module 13 is arranged on the refrigerating pipeline 15. The third heat exchange passage 61 is provided on the first heat exchange pipeline 17, and the first heat exchange passage 51 is provided on the second heat exchange pipeline 21. The compressor 11, the heating pipeline 16, the first heat exchange pipeline 17, the refrigerating pipeline 15, and the gas-liquid separator 14 are connected. The first switching pipeline 19, the second heat exchange pipeline 21, and the refrigerating pipeline 15 are connected in parallel, and the refrigerating pipeline 15, the first switching pipeline 19, and the second heat exchange pipeline 21 are selectably in communication in series between the first heat exchange pipeline 17 and the gas-liquid separator 14 respectively.

The second switching pipeline 18 and the first switching pipeline 19 may play a role of a switching passage, and the refrigerant may selectively pass through the second switching pipeline 18 and the first switching pipeline 19, so that different modes may be formed, to cope with different conditions.

The following provides a detailed description of the refrigerating mode, the heating mode, and the battery refrigerating mode of the heat pump module 10.

When being in the refrigerating mode, the refrigerant sequentially passes through the compressor 11, the heating pipeline 16, the first heat exchange pipeline 17, the refrigerating pipeline 15, and the gas-liquid separator 14. In an embodiment, under compression of the compressor 11, the refrigerant forms a high-pressure gaseous refrigerant, and the high-pressure gaseous refrigerant passes through the heating pipeline 16, but the condenser module 12 on the heating pipeline 16 does not work, and the high-pressure gaseous refrigerant continues to pass through the first heat exchange pipeline 17. Because the first heat exchange pipeline 17 is connected to the second heat exchanger 60, the high-pressure gaseous refrigerant is passed into the second heat exchanger 60. In this case, the second heat exchanger 60 plays a role of a condenser, the second heat exchanger 60 releases heat, and the second heat exchanger 60 is in communication with the radiator waterway 32 through the fourth heat exchange passage 62. In this way, the heat released by the second heat exchanger 60 may be passed into the radiator waterway 32 through the fourth heat exchange passage 62, and the heat may be released into the air outside the vehicle 2 through the radiator 320, so that the high-pressure gaseous refrigerant in the second heat exchanger 60 may release a large amount of heat, to form a liquid refrigerant. Then the liquid refrigerant is passed into the evaporator module 13 of the refrigerating pipeline 15, and the evaporator module 13 on the refrigerating pipeline 15 works. The evaporator module 13 evaporates and absorbs the heat in the passenger compartment, to refrigerate the passenger compartment, so that the liquid refrigerant in the evaporator module 13 absorbs the heat to form the low-pressure gaseous refrigerant. The low-pressure gaseous refrigerant flows into the gas-liquid separator 14, and the gas-liquid separator 14 separates the liquid refrigerant doped in the low-pressure gaseous refrigerant. Finally, the low-pressure gaseous refrigerant is passed into the compressor 11, and the compressor 11 compresses the low-pressure gaseous refrigerant. In this way, the heat pump module 10 may form a refrigerating circulation, and may cool the passenger compartment consistently.

When being in the heating mode, the refrigerant sequentially passes through the compressor 11, the heating pipeline 16, the first heat exchange pipeline 17, the first switching pipeline 19, and the gas-liquid separator 14. In an embodiment, under compression of the compressor 11, the refrigerant forms a high-pressure gaseous refrigerant. The high-pressure gaseous refrigerant is passed into the condenser module 12 of the heating pipeline 16, and the condenser module 12 on the heating pipeline 16 works. The condenser module 12 releases a large amount of heat into the passenger compartment, to heat the passenger compartment, so that the high-pressure gaseous refrigerant in the condenser module 12 releases a large amount of heat, to form a liquid refrigerant, and the liquid refrigerant continues to pass through the first heat exchange pipeline 17. Because the first heat exchange pipeline 17 is connected to the second heat exchanger 60, the liquid refrigerant is passed into the second heat exchanger 60. In this case, the second heat exchanger 60 plays a role of an evaporator. The second heat exchanger 60 absorbs the heat in the air outside the vehicle 2 or the heat generated in each module through the electric assembly module 30, so that the liquid refrigerant in the second heat exchanger 60 may absorb a large amount of heat, and form the low-pressure gaseous refrigerant. Then the low-pressure gaseous refrigerant is passed into the gas-liquid separator 14 through the first switching pipeline 19, and the gas-liquid separator 14 separates the liquid refrigerant doped in the low-pressure gaseous refrigerant. Finally, the low-pressure gaseous refrigerant is passed into the compressor 11, and the compressor 11 compresses the low-pressure gaseous refrigerant. In this way, the heat pump module 10 may form a heating circulation, and may heat the passenger compartment consistently.

When being in the battery refrigerating mode, the refrigerant sequentially passes through the compressor 11, the heating pipeline 16, the second switching pipeline 18, the first heat exchange passage 51, and the gas-liquid separator 14. In other words, when the passenger compartment is in the heating mode, the excess heat of the battery module 20 is absorbed for heating. In an embodiment, under compression of the compressor 11, the refrigerant forms a high-pressure gaseous refrigerant. The high-pressure gaseous refrigerant is passed into the condenser module 12 of the heating pipeline 16, and the condenser module 12 on the heating pipeline 16 works. The condenser module 12 releases a large amount of heat into the passenger compartment, to heat the passenger compartment, so that the high-pressure gaseous refrigerant in the condenser module 12 releases a large amount of heat, to form a liquid refrigerant, and the liquid refrigerant continues to enter the first heat exchange passage 51 through the second switching pipeline 18. Because the first heat exchange passage 51 is connected to the first heat exchanger 50, the liquid refrigerant is passed into the first heat exchanger 50. In this case, the first heat exchanger 50 plays a role of an evaporator. In addition, the battery module 20 generates a large amount of heat during working, and the first heat exchanger 50 absorbs the large amount of heat generated by the battery module 20, so that the battery module 20 may be cooled down, and the liquid refrigerant in the first heat exchanger 50 absorbs a large amount of heat, to form the low-pressure gaseous refrigerant. Then the low-pressure gaseous refrigerant is passed into the gas-liquid separator 14, and the gas-liquid separator 14 separates the liquid refrigerant doped in the low-pressure gaseous refrigerant. Finally, the low-pressure gaseous refrigerant is passed into the compressor 11, and the compressor 11 compresses the low-pressure gaseous refrigerant. In this way, the passenger compartment may be heated continuously, to improve driving comfort of the user, and the temperature of the battery module 20 may also be lowered, to prevent the battery module 20 from being damaged due to excessive heat. In this way, energy is fully made use of, and energy loss is reduced.

As shown in FIG. 1 to FIG. 5, a third two-way valve 180 is arranged on the second switching pipeline 18, and a fourth two-way valve 190 is arranged on the first switching pipeline 19. Both the third two-way valve 180 and the fourth two-way valve 190 may play a role of being selectively connected and disconnected, so that the second switching pipeline 18 and the first switching pipeline 19 may be selectively connected and disconnected, so that connections between various modes are more accurate and stable.

In some embodiments, as shown in FIG. 1 to FIG. 5, the condenser module 12 includes: a first condenser 120 and a second condenser 121, and the second condenser 121 and the first condenser 120 are selectively connected in parallel. For example, the heating pipeline 16 includes: a front heating branch 160 and a rear heating branch 161 that are arranged in parallel. The first condenser 120 is arranged in the front heating branch 160, and the second condenser 121 is arranged in the rear heating branch 161. A fifth two-way valve 162 is arranged on at least one of the front heating branch 160 and the rear heating branch 161. In other words, when the heat pump module 10 is in the heating mode, both the first condenser 120 and the second condenser 121 work, and the fifth two-way valve 162 is in a communication state. The refrigerant is passed into the first condenser 120 and the second condenser 121 respectively through the front heating branch 160 and the rear heating branch 161. When the heat pump module 10 is in the refrigerating mode, neither the first condenser 120 nor the second condenser 121 works, and the fifth two-way valve 162 arranged on the front heating branch 160 is in a communication state. The fifth two-way valve 162 arranged on the rear heating branch 161 is in a disconnected state, and the refrigerant passes through the first condenser 120 on the front heating branch 160. In this way, the setting is more proper, and connection and disconnection of the fifth two-way valve 162 may be properly used, thereby making communication of the heating pipeline 16 more accurate.

In some embodiments, as shown in FIG. 1 to FIG. 5, the refrigerating pipeline 15 includes: the front refrigerating branch 150 and the rear refrigerating branch 151 that are arranged in parallel, and the evaporator module 13 includes: a first evaporator 130 and a second evaporator 131. The first evaporator 130 and the second evaporator 131 are connected in parallel between two connection ends. The first evaporator 130 is arranged on the front refrigerating branch 150, and the second evaporator 131 is arranged on the rear refrigerating branch 151. In other words, when the heat pump module 10 is in the heating mode, neither the first evaporator 130 nor the second evaporator 131 works, and the refrigerant also does not pass through the front refrigerating branch 150 and the rear refrigerating branch 151. When the heat pump module 10 is in the refrigerating mode, both the first evaporator 130 and the second evaporator 131 work, and the refrigerant is passed into the first evaporator 130 and the second evaporator 131 through the front refrigerating branch 150 and the rear refrigerating branch 151 respectively. In this way, the setting is more proper, and a refrigerating effect of the heat pump module 10 may be implemented.

In some embodiments, as shown in FIG. 1 to FIG. 5, a second two-way valve 153 is arranged on the refrigerating pipeline 15. One end (e.g., a first end) of the second two-way valve 153 is connected to the first heat exchange pipeline 17, and another end (e.g., a second end) of the second two-way valve 153 is connected to one end of the first evaporator 130 connected to the second evaporator 131 in parallel (e.g., one of the two connection ends).

For example, the refrigerating pipeline 15 further includes: a main refrigerating flow path 152. The main refrigerating flow path 152 is connected to the front refrigerating branch 150 and the rear refrigerating branch 151 respectively, and a second two-way valve 153 is arranged on the main refrigerating flow path 152. One end of the second two-way valve 153 is connected to the first heat exchange pipeline 17, and another end of the second two-way valve 153 is connected to one end of the first evaporator 130 connected to the second evaporator 131 in parallel. The main refrigerating flow path 152 is arranged upstream of the front refrigerating branch 150 and the rear refrigerating branch 151. Before passing through the front refrigerating branch 150 and the rear refrigerating branch 151, the refrigerant needs to pass through the main refrigerating flow path 152. A second two-way valve 153 is arranged on the main refrigerating flow path 152. When the heat pump module 10 is in the heating mode, the second two-way valve 153 is disconnected. In this way, the refrigerant cannot enter the front refrigerating branch 150 and the rear refrigerating branch 151. When the heat pump module 10 is in the refrigerating mode, the second two-way valve 153 is in communication. In this way, the refrigerant may enter the front refrigerating branch 150 and the rear refrigerating branch 151. In this way, the setting is more proper, and connection and disconnection of the second two-way valve 153 may be properly used, thereby making communication of the refrigerating pipeline 15 more accurate.

In some embodiments, as shown in FIG. 1 to FIG. 5, the first heat exchange pipeline 17 includes: a seventh two-way valve 170, an expansion valve 171, and a one-way valve 172. The seventh two-way valve 170 and the expansion valve 171 are connected to one end of the third heat exchange passage 61. The one-way valve 172 is connected to the other end of the third heat exchange passage 61, and the one-way valve 172 allows the refrigerant to flow from the third heat exchange passage 61 to the refrigerating pipeline 15. One end of the second switching pipeline 18 is connected to an outlet of the one-way valve 172, and one end of the first switching pipeline 19 is connected to an inlet of the one-way valve 172.

The seventh two-way valve 170 and the expansion valve 171 are connected to one end of the third heat exchange passage 61. The seventh two-way valve 170 may play a role of selective connection and disconnection, and the expansion valve 171 may throttle a medium-temperature and high-pressure liquid refrigerant into low-temperature and low-pressure wet steam in the refrigerating mode. When the heat pump module 10 is in the refrigerating mode, the seventh two-way valve 170 is in communication, and the expansion valve 171 works. When the heat pump module 10 is in the heating mode, the seventh two-way valve 170 is disconnected, and the expansion valve 171 does not work. In this way, the refrigerating mode and the heating mode of the heat pump module 10 may be made more accurate and stable. The one-way valve 172 is connected to the other end of the third heat exchange passage 61, and the one-way valve 172 may only flow in one direction. In this way, the one-way valve 172 allows the refrigerant to flow from the third heat exchange passage 61 to the refrigerating pipeline 15 without causing the refrigerant to flow in a reverse direction, thereby ensuring accuracy of a flow path of the refrigerant. One end of the second switching pipeline 18 is connected to the outlet of the one-way valve 172, and one end of the first switching pipeline 19 is connected to the inlet of the one-way valve 172. In other words, the refrigerant may flow through the one-way valve 172 after passing through the third heat exchange passage 61, or may also flow through the first switching pipeline 19. After flowing out from the one-way valve 172, the refrigerant may flow to the refrigerating pipeline 15 or flow to the second switching pipeline 18. In this way, paths through which the refrigerant flows may be diversified, so that the heat pump module 10 may have a plurality of different modes.

In some embodiments, as shown in FIG. 1 to FIG. 5, the heat management system 1 further includes the engine waterway 44. The engine waterway 44 includes the engine 41 and a warm air core 42, and the engine 41 and the warm air core 42 are connected in series. The engine 41 is a main part of the engine waterway 44 and mainly plays a role of driving, thereby driving the movement of the vehicle 2. Moreover, the engine 41 emits heat after working, and the heat may be passed into other modules, to heat other modules. When the engine 41 generates too much heat, the excess heat also needs to be released into the air outside the vehicle 2. The warm air core 42 may play a role of warm air heating, and the warm air may be released into the passenger compartment, thereby heating the passenger compartment to a certain extent, and improving comfort of the user.

Figure 6:
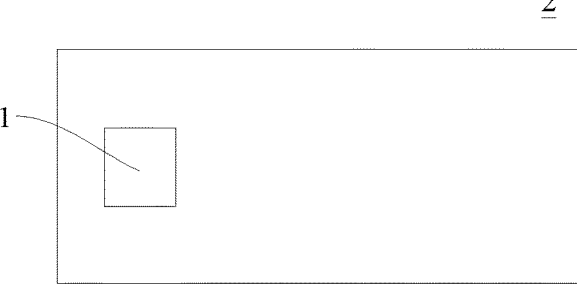
FIG. 6 is a schematic diagram of a vehicle according to an embodiment of the present disclosure.

The vehicle 2 according to the embodiment of the present disclosure, as shown in FIG. 6, includes the heat management system 1 described in the foregoing embodiment.

In the description of the present disclosure, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial", "radial", and "circumferential" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of the present disclosure.

In the description of the present disclosure, a "first feature" or a "second feature" may include one or more features. In the description of the present disclosure, "a plurality of" means two or more than two. In the description of the present disclosure, that a first feature is "on" or "under" a second feature may include that the first and second features are in direct contact, or may include that the first and second features are not in direct contact but in contact by using other features therebetween. In the description of the present disclosure, that the first feature is "on", "above", or "over" the second feature includes that the first feature is right above and on the inclined top of the second feature or merely indicates that a level of the first feature is higher than that of the second feature.

In the descriptions of this specification, descriptions using reference terms "an embodiment", "some embodiments", "an exemplary embodiment", "an example", "a specific example", or "some examples" mean that specific characteristics, structures, materials, or features described with reference to the embodiment or example are included in at least one embodiment or example of the present disclosure.

In this specification, schematic descriptions of the foregoing terms do not necessarily point at a same embodiment or example.

Although the embodiments of the present disclosure have been shown and described, a person of ordinary skill in the art is to be understand that various changes, modifications, replacements, and variations may be made to the embodiments without departing from the principles and spirit of the present disclosure, and the scope of the present disclosure is as defined by the appended claims and their equivalents.

What is claimed is:

1. A heat management system for a vehicle, comprising:
a first heat exchanger having a first heat exchange passage and a second heat exchange passage;
a second heat exchanger having a third heat exchange passage and a fourth heat exchange passage;
a heat pump comprising a compressor, a heating pipeline, a first heat exchange pipeline, a refrigerating pipeline, a gas-liquid separator, a first switching pipeline, and a second heat exchange pipeline; a condenser disposed on the heating pipeline, an evaporator disposed on the refrigerating pipeline, the third heat exchange passage disposed on the first heat exchange pipeline, and the first heat exchange passage disposed on the second heat exchange pipeline; the compressor, the heating pipeline, the first heat exchange pipeline, the refrigerating pipeline, and the gas-liquid separator being connected sequentially; the refrigerating pipeline, the first switching pipeline, and the second heat exchange pipeline being connected in parallel; and the refrigerating pipeline, the first switching pipeline, and the second heat exchange pipeline being in communication between the first heat exchange pipeline and the gas-liquid separator;
an electric assembly waterway;
a radiator waterway, an electric assembly disposed on the electric assembly waterway, a radiator disposed on the radiator waterway, the radiator waterway being in communication with the electric assembly waterway, and the radiator waterway being in communication with the fourth heat exchange passage; and
a heat exchange waterway, the second heat exchange passage disposed on the heat exchange waterway.

2. The heat management system according to claim 1, further comprising:
a battery waterway, a battery disposed on the battery waterway; and
a control valve group connected to the battery waterway, the electric assembly waterway, the radiator waterway, and the heat exchange waterway, and configured to switch between a first state and a second state;
when the control valve group is in the first state,
the radiator waterway being in communication with the electric assembly waterway or the fourth heat exchange passage, or
the battery waterway being in communication with the heat exchange waterway, or
the radiator waterway being in communication with the electric assembly waterway or the fourth heat exchange passage; and
the battery waterway being in communication with the heat exchange waterway; and
when the control valve group is in the second state, the battery waterway being in communication with the electric assembly waterway or the fourth heat exchange passage.

3. The heat management system according to claim 2, further comprising:
an engine waterway an engine disposed on the engine waterway, the first state of the control valve group comprising a first sub-state and a second sub-state, and the second state of the control valve group comprising a third sub-state and a fourth sub-state;
when the control valve group is in the first sub-state, the electric assembly waterway or the fourth heat exchange passage being in communication with the radiator waterway;
when the control valve group is in the second sub-state, (1) the electric assembly waterway or the fourth heat exchange passage, (2) the radiator waterway, and (3) the engine waterway being in communication sequentially;
when the control valve group is in the third sub-state, the electric assembly waterway or the fourth heat exchange passage being in communication with the battery waterway; and
when the control valve group is in the fourth sub-state, (1) the electric assembly waterway or the fourth heat exchange passage, (2) the battery waterway, and (3) the engine waterway being in communication sequentially.

4. The heat management system according to claim 3, wherein the control valve group comprises:
a first four-way valve, wherein the first four-way valve has a first valve port, a second valve port, a third valve port, and a fourth valve port, wherein the first valve port and the second valve port are respectively disposed at a first end of the electric assembly waterway and a first end of the radiator waterway, and the third valve port and the fourth valve port are disposed on the engine waterway;
a second four-way valve, wherein the second four-way valve has a fifth valve port, a sixth valve port, a seventh valve port, and an eighth valve port, wherein the fifth valve port and the sixth valve port are disposed on the radiator waterway, and the seventh valve port and the eighth valve port are disposed on the battery waterway; and
a third four-way valve, wherein the third four-way valve has a ninth valve port, a tenth valve port, an eleventh valve port, and a twelfth valve port, wherein the ninth valve port and the tenth valve port are disposed at a second end of the electric assembly waterway and a second end of the radiator waterway, and the eleventh valve port and the twelfth valve port are disposed on the battery waterway; wherein:
when the control valve group is in the first sub-state, the first valve port is in communication with the second valve port, the third valve port is in communication with the fourth valve port, the fifth valve port is in communication with the sixth valve port, the seventh valve port is in communication with the eighth valve port, the ninth valve port is in communication with the tenth valve port, and the eleventh valve port is in communication with the twelfth valve port;
when the control valve group is in the second sub-state, the first valve port is in communication with the fourth valve port, the second valve port is in communication with the third valve port, the fifth valve port is in communication with the sixth valve port, the seventh valve port is in communication with the eighth valve port, the ninth valve port is in communication with the tenth valve port, and the eleventh valve port is in communication with the twelfth valve port;

when the control valve group is in the third sub-state, the first valve port is in communication with the second valve port, the third valve port is in communication with the fourth valve port, the fifth valve port is in communication with the eighth valve port, the sixth valve port is in communication with the seventh valve port, the ninth valve port is in communication with the twelfth valve port, and the tenth valve port is in communication with the eleventh valve port; and when the control valve group is in the fourth sub-state, the first valve port is in communication with the fourth valve port, the second valve port is in communication with the third valve port, the fifth valve port is in communication with the eighth valve port, the sixth valve port is in communication with the seventh valve port, the ninth valve port is in communication with the twelfth valve port, and the tenth valve port is in communication with the eleventh valve port.

5. The heat management system according to claim 4, wherein a first two-way valve is disposed on the electric assembly waterway, and the first two-way valve controls the electric assembly waterway to be in communication or not in communication between the sixth valve port of the second four-way valve and the ninth valve port of the third four-way valve.

6. The heat management system according to claim 1, wherein the radiator waterway comprises a radiator branch and a connected branch, the radiator is disposed on the radiator branch, the radiator branch and the connected branch are connected in parallel, and the radiator branch and the connected branch are configured to switch between a communication state and an non-communication state.

7. The heat management system according to claim 1, wherein the condenser comprises: a first condenser and a second condenser, and the second condenser and the first condenser are connected in parallel.

8. The heat management system according to claim 1, wherein the evaporator comprises: a first evaporator and a second evaporator, and the first evaporator and the second evaporator are connected in parallel between two connection ends.

9. The heat management system according to claim 8, wherein a second two-way valve is disposed on the refrigerating pipeline, and a first end of the second two-way valve is connected to the first heat exchange pipeline and a second end of the second two-way valve is connected to one of the two connection ends.

10. The heat management system according to claim 1, further comprising: an engine waterway, the engine waterway comprising an engine and a warm air core, and the engine and the warm air core being connected in series.

11. A vehicle, comprising a heat management system for a vehicle, the heat management system comprising:
a first heat exchanger having a first heat exchange passage and a second heat exchange passage;
a second heat exchanger having a third heat exchange passage and a fourth heat exchange passage;
a heat pump comprising a compressor, a heating pipeline, a first heat exchange pipeline, a refrigerating pipeline, a gas-liquid separator, a first switching pipeline, and a second heat exchange pipeline; a condenser disposed on the heating pipeline, an evaporator disposed on the refrigerating pipeline, the third heat exchange passage disposed on the first heat exchange pipeline, and the first heat exchange passage disposed on the second heat exchange pipeline; the compressor, the heating pipeline, the first heat exchange pipeline, the refrigerating pipeline, and the gas-liquid separator being connected sequentially; the refrigerating pipeline, the first switching pipeline, and the second heat exchange pipeline being connected in parallel; and the refrigerating pipeline, the first switching pipeline, and the second heat exchange pipeline being in communication between the first heat exchange pipeline and the gas-liquid separator;
an electric assembly waterway;
a radiator waterway, an electric assembly disposed on the electric assembly waterway, a radiator disposed on the radiator waterway, the radiator waterway being in communication with the electric assembly waterway, and the radiator waterway being in communication with the fourth heat exchange passage; and
a heat exchange waterway, the second heat exchange passage disposed on the heat exchange waterway.

12. The vehicle according to claim 11, wherein the heat management system further comprises:
a battery waterway, a battery disposed on the battery waterway; and
a control valve group connected to the battery waterway, the electric assembly waterway, the radiator waterway, and the heat exchange waterway, and configured to switch between a first state and a second state;
when the control valve group is in the first state,
the radiator waterway being in communication with the electric assembly waterway or the fourth heat exchange passage, or
the battery waterway being in communication with the heat exchange waterway, or
the radiator waterway being in communication with the electric assembly waterway or the fourth heat exchange passage; and
the battery waterway being in communication with the heat exchange waterway; and
when the control valve group is in the second state, the battery waterway being in communication with the electric assembly waterway or the fourth heat exchange passage.

13. The vehicle according to claim 12, wherein the heat management system further comprises:
an engine waterway an engine disposed on the engine waterway, the first state of the control valve group comprising a first sub-state and a second sub-state, and the second state of the control valve group comprising a third sub-state and a fourth sub-state;
when the control valve group is in the first sub-state, the electric assembly waterway or the fourth heat exchange passage being in communication with the radiator waterway;
when the control valve group is in the second sub-state, (1) the electric assembly waterway or the fourth heat exchange passage, (2) the radiator waterway, and (3) the engine waterway being in communication sequentially;
when the control valve group is in the third sub-state, the electric assembly waterway or the fourth heat exchange passage being in communication with the battery waterway; and
when the control valve group is in the fourth sub-state, (1) the electric assembly waterway or the fourth heat exchange passage, (2) the battery waterway, and (3) the engine waterway being in communication sequentially.

14. The vehicle according to claim 13, wherein the control valve group comprises:

a first four-way valve, wherein the first four-way valve has a first valve port, a second valve port, a third valve port, and a fourth valve port, wherein the first valve port and the second valve port are respectively disposed at a first end of the electric assembly waterway and a first end of the radiator waterway, and the third valve port and the fourth valve port are disposed on the engine waterway;

a second four-way valve, wherein the second four-way valve has a fifth valve port, a sixth valve port, a seventh valve port, and an eighth valve port, wherein the fifth valve port and the sixth valve port are disposed on the radiator waterway, and the seventh valve port and the eighth valve port are disposed on the battery waterway; and a third four-way valve, wherein the third four-way valve has a ninth valve port, a tenth valve port, an eleventh valve port, and a twelfth valve port, wherein the ninth valve port and the tenth valve port are disposed at a second end of the electric assembly waterway and a second end of the radiator waterway, and the eleventh valve port and the twelfth valve port are disposed on the battery waterway; wherein:

when the control valve group is in the first sub-state, the first valve port is in communication with the second valve port, the third valve port is in communication with the fourth valve port, the fifth valve port is in communication with the sixth valve port, the seventh valve port is in communication with the eighth valve port, the ninth valve port is in communication with the tenth valve port, and the eleventh valve port is in communication with the twelfth valve port;

when the control valve group is in the second sub-state, the first valve port is in communication with the fourth valve port, the second valve port is in communication with the third valve port, the fifth valve port is in communication with the sixth valve port, the seventh valve port is in communication with the eighth valve port, the ninth valve port is in communication with the tenth valve port, and the eleventh valve port is in communication with the twelfth valve port;

when the control valve group is in the third sub-state, the first valve port is in communication with the second valve port, the third valve port is in communication with the fourth valve port, the fifth valve port is in communication with the eighth valve port, the sixth valve port is in communication with the seventh valve port, the ninth valve port is in communication with the twelfth valve port, and the tenth valve port is in communication with the eleventh valve port; and when the control valve group is in the fourth sub-state, the first valve port is in communication with the fourth valve port, the second valve port is in communication with the third valve port, the fifth valve port is in communication with the eighth valve port, the sixth valve port is in communication with the seventh valve port, the ninth valve port is in communication with the twelfth valve port, and the tenth valve port is in communication with the eleventh valve port.

15. The vehicle according to claim 14, wherein a first two-way valve is disposed on the electric assembly waterway, and the first two-way valve controls the electric assembly waterway to be in communication or not in communication between the sixth valve port of the second four-way valve and the ninth valve port of the third four-way valve.

16. The vehicle according to claim 11, wherein the radiator waterway comprises a radiator branch and a connected branch, the radiator is disposed on the radiator branch, the radiator branch and the connected branch are connected in parallel, and the radiator branch and the connected branch are configured to switch between a communication state and a non-communication state.

17. The vehicle according to claim 11, wherein the condenser comprises: a first condenser and a second condenser, and the second condenser and the first condenser are connected in parallel.

18. The vehicle according to claim 11, wherein the evaporator comprises: a first evaporator and a second evaporator, and the first evaporator and the second evaporator are connected in parallel between two connection ends.

19. The vehicle according to claim 18, wherein a second two-way valve is disposed on the refrigerating pipeline, and a first end of the second two-way valve is connected to the first heat exchange pipeline and a second end of the second two-way valve is connected to one of the two connection ends.

20. The vehicle according to claim 11, wherein the heat management system further comprises: an engine waterway, the engine waterway comprising an engine and a warm air core, and the engine and the warm air core being connected in series.

* * * * *